US011990865B2

(12) United States Patent
Kunesh

(10) Patent No.: US 11,990,865 B2
(45) Date of Patent: *May 21, 2024

(54) RAPIDLY DEPLOYING TRANSPORTABLE SOLAR PANEL SYSTEMS AND METHODS OF USING SAME

(71) Applicant: SacTec Solar Inc., Palm Springs, CA (US)

(72) Inventor: Robert Kunesh, Carson, CA (US)

(73) Assignee: SacTec Solar Inc., Palm Springs, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/700,444

(22) Filed: Mar. 21, 2022

(65) Prior Publication Data

US 2022/0216825 A1 Jul. 7, 2022

Related U.S. Application Data

(63) Continuation of application No. 15/688,520, filed on Aug. 28, 2017, now Pat. No. 11,283,397.

(Continued)

(51) Int. Cl.
*H02S 30/20* (2014.01)
*F24S 20/50* (2018.01)
(Continued)

(52) U.S. Cl.
CPC .............. *H02S 30/20* (2014.12); *F24S 20/50* (2018.05); *F24S 30/452* (2018.05); *H02S 20/30* (2014.12);
(Continued)

(58) Field of Classification Search
CPC .......... H02S 30/20; H02S 20/30; F24S 20/50; F24S 30/452
See application file for complete search history.

(56) References Cited

U.S. PATENT DOCUMENTS 8,371,088 B2 * 2/2013 Merrifield ............... E04C 3/005
52/109
9,046,281 B2 * 6/2015 Curran .................... F24S 25/10
(Continued)

FOREIGN PATENT DOCUMENTS

EP 2822178 B1 * 10/2016
JP 10125945 A * 5/1998
(Continued)

*Primary Examiner* — Stanton L Krycinski
(74) *Attorney, Agent, or Firm* — Invention To Patent Services; Alex Hobson

(57) ABSTRACT

Embodiments disclosed herein are directed to a rapidly deploying transportable power system for generating power. The rapidly deploying transportable power system embodiment disclosed herein can have a plurality of frame members containing a plurality of solar panels. Any embodiments of the rapidly deploying transportable power system can also have a transport enclosure configured to support the plurality of frame members and a rail system coupleable with the transport enclosure, the rail system being configured to support the plurality of frame members outside of the transport enclosure. In any embodiments, the plurality of frame members can be positionable within the transport enclosure with one frame member positionable above another frame member. Furthermore, the plurality of frame members can be movable along the rail system to positions outside of the transport enclosure along the track system.

18 Claims, 23 Drawing Sheets

Related U.S. Application Data

(60) Provisional application No. 62/380,805, filed on Aug. 29, 2016.

(51) Int. Cl.
  *F24S 30/452* (2018.01)
  *H02S 20/30* (2014.01)
  *F24S 20/55* (2018.01)
  *F24S 25/00* (2018.01)

(52) U.S. Cl.
  CPC .......... *F24S 20/55* (2018.05); *F24S 2025/012* (2018.05); *F24S 2025/014* (2018.05); *Y02E 10/47* (2013.01)

(56) References Cited

U.S. PATENT DOCUMENTS

| | | | | |
|---|---|---|---|---|
| 9,048,780 B2* | 6/2015 | Caster | .................... | H02S 10/00 |
| 9,246,035 B2* | 1/2016 | Eaton, Jr. | ............... | H01L 31/042 |
| 9,249,565 B2* | 2/2016 | Merrifield | ................. | E04C 3/02 |
| 9,287,822 B2* | 3/2016 | Levi | ........................ | F24S 25/70 |
| 9,559,232 B1* | 1/2017 | Naud | ..................... | H02S 30/20 |
| 9,780,720 B2* | 10/2017 | Ansari | .................... | F03D 13/40 |
| 10,024,050 B2* | 7/2018 | Merrifield | ................ | B64G 1/44 |
| 10,742,163 B2* | 8/2020 | Tehan | ..................... | H02S 10/40 |
| 2011/0253193 A1* | 10/2011 | Korman | .................. | F24S 25/10 |
| | | | | 136/245 |
| 2011/0253614 A1* | 10/2011 | Curran | .................... | H02S 30/20 |
| | | | | 136/245 |
| 2012/0291847 A1 | 11/2012 | Rowe, Jr. et al. | | |
| 2013/0019925 A1 | 1/2013 | Britcher | | |
| 2013/0186450 A1 | 6/2013 | Smith et al. | | |
| 2013/0187464 A1* | 7/2013 | Smith | .................... | H02S 10/40 |
| | | | | 307/68 |
| 2014/0020731 A1 | 1/2014 | Levi et al. | | |
| 2014/0158650 A1 | 4/2014 | Krantz et al. | | |
| 2016/0173025 A1* | 6/2016 | Baumgartner | .......... | H02S 20/20 |
| | | | | 136/245 |
| 2016/0352285 A1* | 12/2016 | Seery | ..................... | H02S 30/20 |

FOREIGN PATENT DOCUMENTS

| | | | |
|---|---|---|---|
| WO | WO-2015074812 A1 | * | 5/2015 |
| WO | WO-2017093540 A1 | * | 6/2017 |
| WO | WO-2017147634 A1 | * | 9/2017 |

* cited by examiner

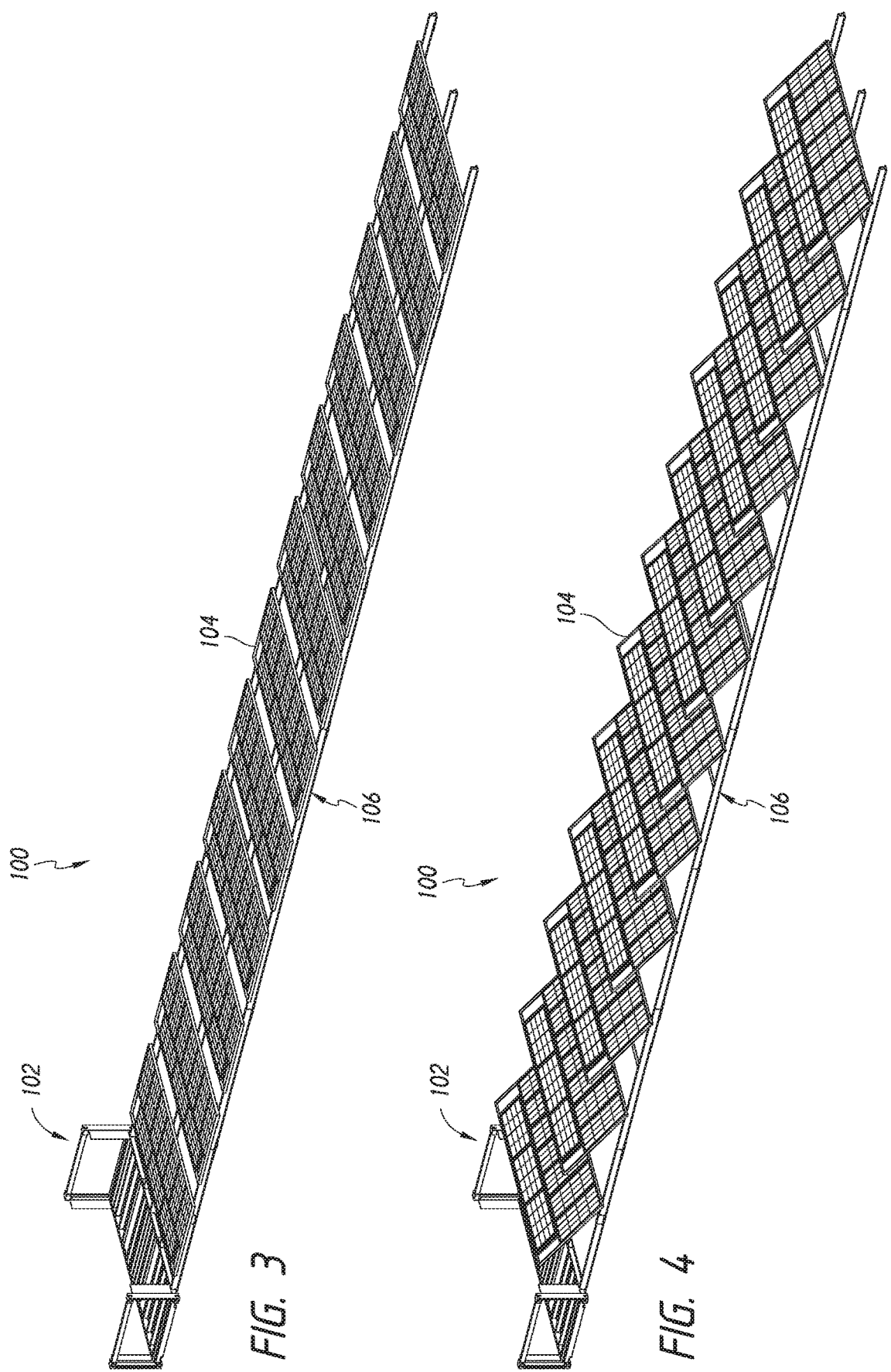

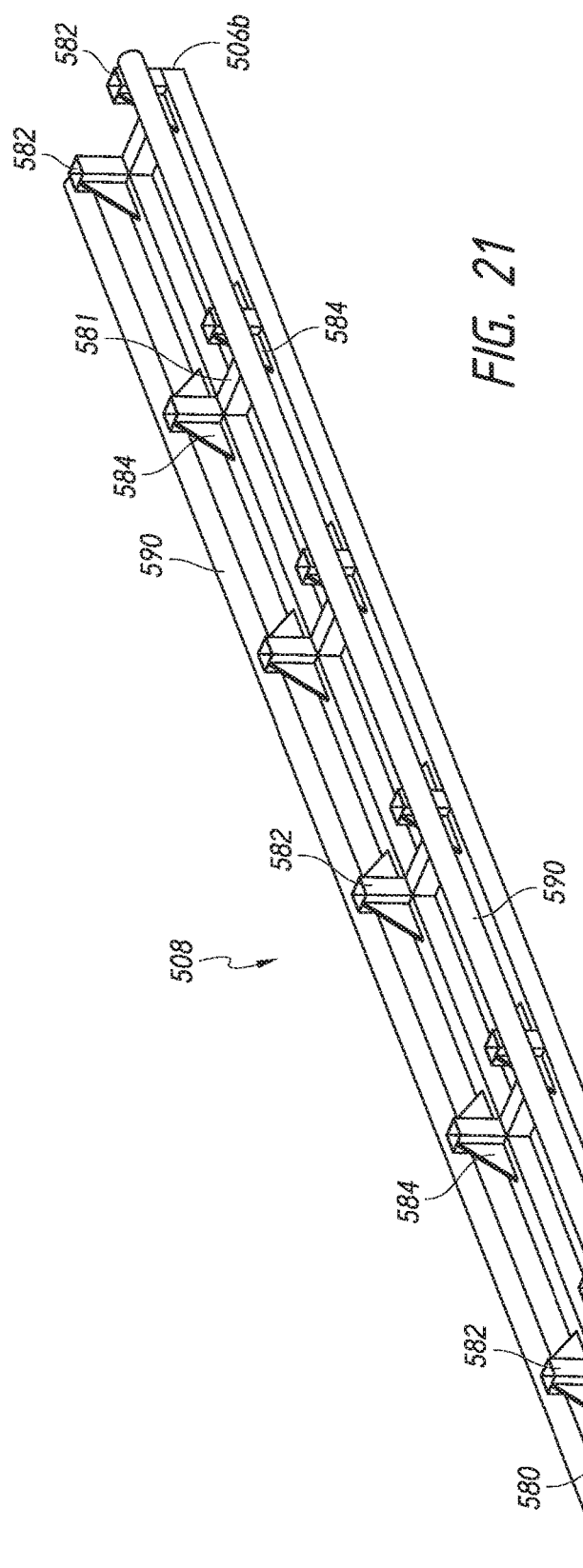
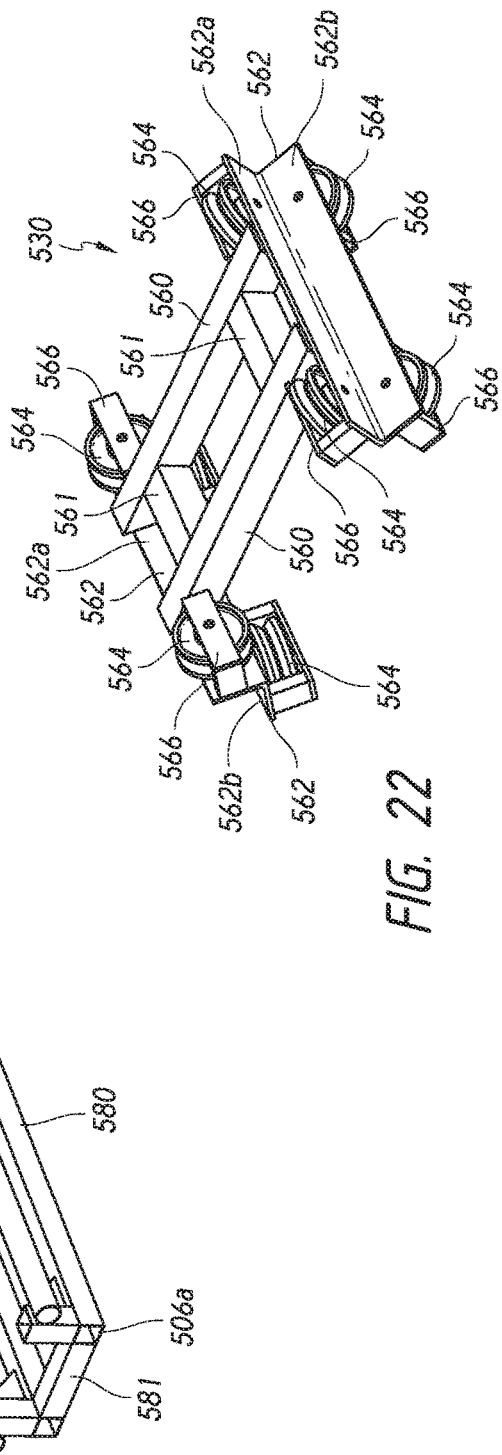
FIG. 21
FIG. 22

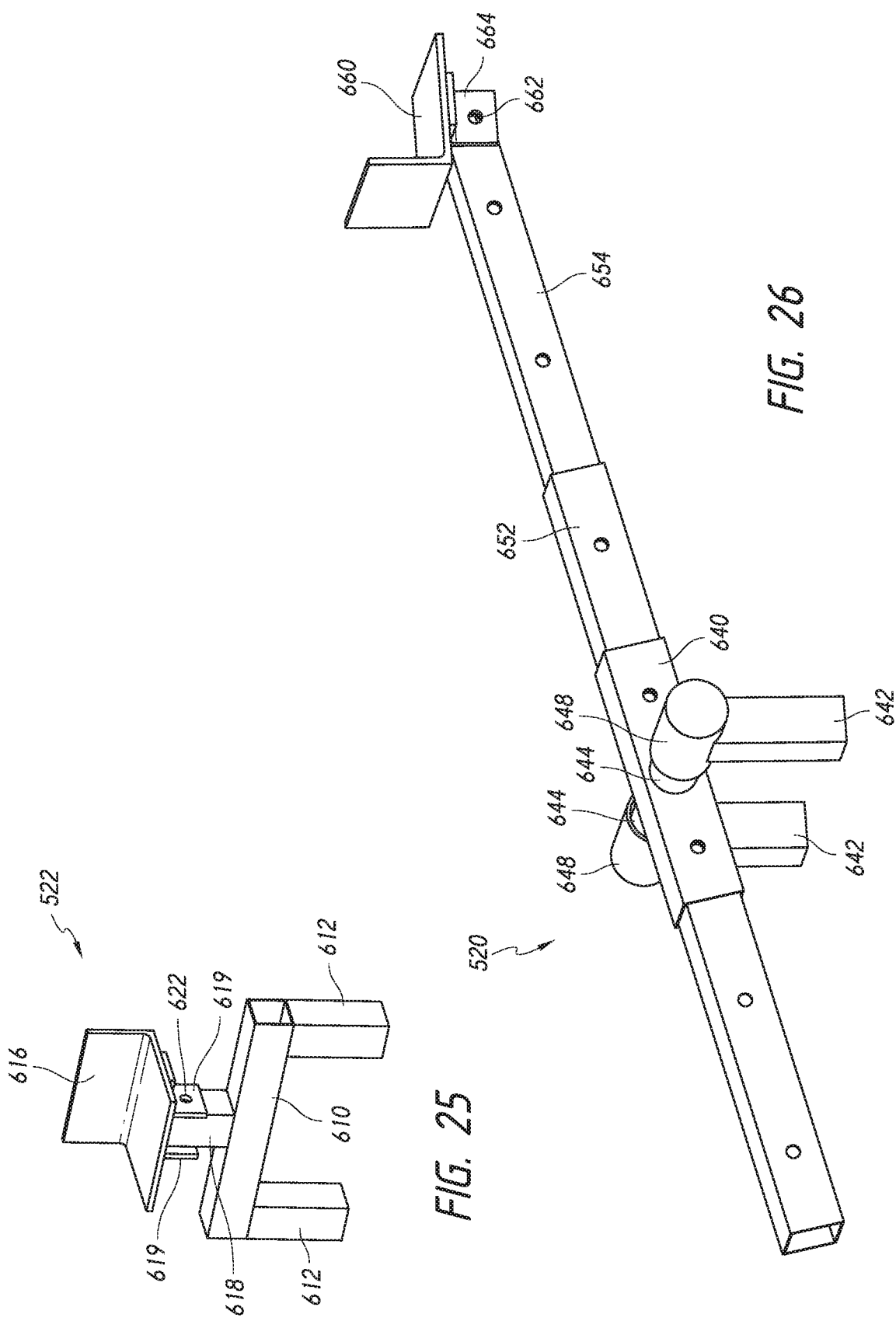

RAPIDLY DEPLOYING TRANSPORTABLE SOLAR PANEL SYSTEMS AND METHODS OF USING SAME

PRIORITY CLAIM

The present application claims priority from U.S. Patent Application No. 62/380,805, filed on Aug. 29, 2016, titled RAPIDLY DEPLOYING TRANSPORTABLE SOLAR PANEL SYSTEMS AND METHODS OF USE, the content of which is incorporated by reference herein in its entirety. The benefit of priority is claimed under the appropriate legal basis including, without limitation, under 35 U.S.C. § 119 (e).

BACKGROUND OF THE DISCLOSURE

Technical Field

The present disclosure relates to the field of solar power systems, including but not limited to portable or transportable solar panel systems.

Description of the Related Art

Transportable and/or portable electrical power sources can be used to supply power to areas that have or do not have access to electrical grids, whether underdeveloped or war torn regions, regions struck by natural disasters, or otherwise. Needless to say, transportable and/or portable electrical power sources can provide a vital, if not critical, resource for such off-grid regions. Transportable and/or portable solar power systems (hereinafter, referred to as "transportable solar power systems") are one of several types of renewable energy generation systems available to provide power to off-grid regions. Rapidly deploying electrical power systems can also be used in on-grid industrial and commercial flat roof mounted applications to augment the daytime power usage in lowering Tier 1 utility charges.

However, traditional transportable solar power systems have a number of limitations. First, many transportable solar power systems have limited capabilities to automatically and even manually track the sun, resulting in a far less efficient generation of power that may peak at noon time and taper off significantly during morning and afternoon hours. Further, many of the traditional transportable solar power systems have not been standardized in terms of the transport structure size and shape, making it more expensive and inefficient to ship such containers. Additionally, traditional component based transportable solar power systems can be limited in terms of the surface area of the solar panels, thereby also limiting the density and power output of such systems. Furthermore, traditional transportable solar power systems can also be difficult and/or time-consuming to deploy, employ or require heavy equipment on-site, some requiring days or even weeks to deploy and set up for use. This can make the deployment and stowing of such systems cumbersome, expensive, and inefficient. Finally, many traditional transportable solar power systems can also be susceptible to damage from high wind conditions, sand, dirt, and other elements, resulting in damaged components and costly repairs that could be avoided if designed to withstand high wind conditions or to have any of the manual and automatic storm repositioning capabilities of the embodiments of the present disclosure.

SUMMARY OF SOME EMBODIMENTS

The devices, systems, and methods disclosed herein have many innovative features and attributes, no single one of which is indispensable or solely responsible for their desirable nature. Without limiting the scope of the claims, some of the advantageous features will now be summarized.

Some embodiments disclosed herein are directed to a transportable power system for generating power. Any embodiment disclosed herein can have a plurality of frame members. Each frame member, also referred to herein as a solar power frame or solar power frame member, can support a plurality of solar panels, each solar panel within each frame member being electrically interconnected. Any embodiments of the transportable power system can also have a transport enclosure (which is also referred to herein as an enclosure) configured to support the plurality of frame members and a rail system coupleable with the transport enclosure, the rail system being configured to support the plurality of frame members outside of the transport enclosure. In any embodiments, the plurality of frame members can be positionable within the transport enclosure in a vertical arrangement, with one frame member positionable above another frame member. Furthermore, the plurality of frame members can be movable along the rail system to positions outside of the transport enclosure along the rail system. Other features and details will be described in the sections that follow.

The following embodiments are disclosed herein in addition to, in combination with, or in the alternative to any of the other embodiments disclosed herein. Embodiment 1 is directed to a rapidly deploying transportable power system for generating power, comprising a transportable enclosure having an interior space, a plurality of solar panel frames, each frame supporting a plurality of solar panels, a plurality of interconnectable track modules, the track modules being couplable together in an end to end arrangement to form a track system, and one or more cart devices movable along a length of the track system to move the frames along the track system when the track system is in the second state. Embodiment 1 can also have, but is not required to have, at least one lift system configured to lift the frames from the interior space of the transport enclosure onto the track system and/or from the track system into the interior space of the transport enclosure.

Each solar panel supported by each frame can be electrically interconnected with the other solar panels of each frame. The solar panel frames and track modules can be moved between a first state and a second state. In the first state, the frames can be all positioned at least substantially within the interior space of the transport enclosure. In the first state, all of the track modules can be positioned within the interior space of the transport enclosure. In the second state, the track modules can be positioned on the ground in a series with the end of one track module coupled with an end of an adjacent track module to form the track system such that the one or more cart devices can be movable continuously along the track system between a first end and a second end of the track system, the first end of the track system being adjacent to the transport enclosure when the frames can be being deployed onto the track system. In the second state, the frames can be supported by the track system outside of the transport enclosure, the frames being positioned along the length of the track system at a predetermined spacing to permit suitable exposure to the sun for each frame.

Embodiment 2 can be directed to the transportable power system of Embodiment 1, with any of the variations noted above, wherein each frame can be supported by at least one bottom bracket and at least one top bracket in the second state, the bottom bracket supporting a lowermost edge of the frame when the frame can be deployed in the second state, and the top bracket having an adjustable length and angular orientation to permit the angular adjustability of the frame about a horizontal axis.

Embodiment 3 is directed to the transportable power system of any of the embodiments disclosed herein, comprising a first track system, a second track system, and two or more carts, wherein, the first track system can extend in a direction that can be generally parallel with the second track system, the first track system can be substantially aligned with the second track system in a lengthwise direction, and at least one cart can be moveable along each of the first and second track systems for moving each frame along the first and second track systems when the track systems can be in the second state.

Embodiment 4 is directed to the transportable power system of any of the embodiments disclosed herein, comprising a first lift system coupled with the transport enclosure adjacent to a first end of the transport enclosure and a second lift system coupled with the transport enclosure adjacent to a second end of the transport enclosure, the first and second lift systems operable simultaneously to lift the frames from the interior space of the transport enclosure onto the track system and/or from the track system into the interior space of the transport enclosure.

Embodiment 5 is directed to the transportable power system of any of the embodiments disclosed herein, wherein each frame can be supported by at least one bottom bracket and at least one top bracket in the second state, and each bottom bracket and top bracket can be supportable by the track system within openings formed in the track modules configured to receive vertical support portions of the top and bottom brackets.

Embodiment 6 is directed to the transportable power system of any of the embodiments disclosed herein, wherein an angular orientation of each of the frames about a horizontal axis can be adjustable.

Embodiment 7 is directed to the transportable power system of any of the embodiments disclosed herein, wherein a rotational orientation of the frames can be changed between at least a first and a second rotational orientation about a vertical axis by rotating the frames.

Embodiment 8 is directed to the transportable power system of any of the embodiments disclosed herein, wherein each of the frames can be pre-wired and has an electrical connector extendable therefrom that can be connected with an electrical connector of an adjacent frame or of another electrical component.

Embodiment 9 is directed to the transportable power system of any of the embodiments disclosed herein, wherein the transport enclosure can be a modified shipping container.

Embodiment 10 is directed to the transportable power system of any of the embodiments disclosed herein, wherein the transport enclosure can be approximately 20 feet long, approximately 8 feet wide, and approximately 57 inches tall, and the power system can produce approximately 24 kW of solar power.

Embodiment 11 is directed to the transportable power system of any of the embodiments disclosed herein, wherein the track modules can be removably secured together in an end to end arrangement in the second state using at least one of brackets, fasteners, and clamps.

Embodiment 12 is directed to the transportable power system of any of the embodiments disclosed herein, further comprising one or more batteries adapted to store energy generated by the solar panels.

Embodiment 13 is directed to the transportable power system of any of the embodiments disclosed herein, wherein the at least one lift system comprises a crane comprising a cable, a wench, and a boom.

Embodiment 14 is directed to the transportable power system of any of the embodiments disclosed herein, comprising a removable cover for covering at least a top surface above the interior space.

Embodiment 15 is directed to the transportable power system of any of the embodiments disclosed herein, comprising a power inverter adapted to change the power generated by the solar panels from direct current to alternating current and a control device configured to control one or more aspects of operation of the transportable power system.

Embodiment 16 is directed to the transportable power system of any of the embodiments disclosed herein, wherein, in the first state, the frames extend through an opening in a side of the transport enclosure.

Embodiment 17 is directed to the transportable power system of any of the embodiments disclosed herein, wherein the track systems and frames can be moved from the first state to the second state and from the second state to the first state with only two operators.

Embodiment 18 is directed to the transportable power system of any of the embodiments disclosed herein, wherein the frames can be less than approximately three inches thick.

Embodiment 19 is directed to the transportable power system of any of the embodiments disclosed herein, comprising solar panel optimizers supported by each frame.

Embodiment 20 is directed to the transportable power system of any of the embodiments disclosed herein, comprising between ten and thirteen frames.

Embodiment 21 is directed to the transportable power system of any of the embodiments disclosed herein, wherein,
    the carts each have a first lower wheel and a first upper wheel on a first side of the cart and a second lower wheel and a second upper wheel on a second side of the cart,
    the first lower wheel can be oriented to roll along a lower half of a first rail member of the track modules,
    the second lower wheel can be oriented to roll along a lower half of a second rail member of the track modules,
    the first upper wheel can be oriented to roll along an upper half of the first rail member, and
    the second upper wheel can be oriented to roll along an upper half of the second rail member.

Embodiment 22 is directed a method of providing transportable solar power, comprising positioning a transportable enclosure on a generally horizontal surface, lifting a plurality of track modules from an interior space of the transportable enclosure onto the generally horizontal surface, arranging the track modules into an end to end arrangement with one another to form at least one track system extending away from the transportable enclosure in a generally linear arrangement, with a first end of the track system positioned adjacent to or near to the transportable enclosure, positioning at least one load carrying device on the at least one track system adjacent to the first end of the track system, moving a first solar panel frame from the interior space of the transportable enclosure onto the at least one load carrying device, moving the first solar panel frame along the track system from the first end of the track system to a first deployment position, and coupling the first solar panel frame to the track system at the first deployment position. This embodiment can also comprise tilting the first solar panel frame to a desired angular orientation for a desired level of solar exposure.

Embodiment 23 is directed to any of the embodiments disclosed herein, wherein the horizontal surface can be a ground surface.

Embodiment 24 is directed to any of the embodiments disclosed herein, wherein the horizontal surface can be a roof surface.

Embodiment 25 is directed to any of the embodiments disclosed herein, comprising supporting one end portion of the first solar panel frame with a first bracket and a second end portion of the first solar panel frame with a second bracket, the second end portion being opposite the first end portion, and adjusting an angular orientation of the first solar panel frame by adjusting a length and an angular orientation of the first bracket.

Embodiment 26 is directed to any of the embodiments disclosed herein, comprising connecting wiring of multiple solar panel frames together using quick connect connectors.

Embodiment 27 is directed to any of the embodiments disclosed herein, comprising moving a second solar panel frame from the interior space of the transportable enclosure onto the at least one load carrying device, moving the second solar panel frame along the track system from the first end of the track system to a second deployment position, coupling the second solar panel frame to the track system at the second deployment position, and tilting the second solar panel frame to a desired angular orientation for a desired level of solar exposure.

Embodiment 28 is directed to any of the embodiments disclosed herein, comprising moving each of at least ten solar panel frames from the interior space of the transportable enclosure onto each of ten different deployment positions along two or more track systems, coupling each of the ten solar panel frames to the track system at the ten deployment positions, and tilting each of the ten of solar panel frame to a desired angular orientation for a desired level of solar exposure.

Embodiment 29 is directed to any of the embodiments disclosed herein, wherein moving a first solar panel frame from the interior space of the transportable enclosure onto the at least one load carrying device comprises lifting the first solar panel frame from the interior space of the transportable enclosure using a crane, rotating the crane and the first solar panel frame to a position that can be above the at least one load carrying device, and lowering the first solar panel frame onto the at least one load carrying device.

Embodiment 30 is directed to any of the embodiments disclosed herein, wherein the transport enclosure can be approximately 20 feet long, approximately 8 feet wide, and approximately 57 inches tall, and the power system can produce approximately 24 kW of solar power.

Embodiment 31 is directed to any of the embodiments disclosed herein, comprising storing at least a portion of the power produced using one or more batteries stored in a climate controlled storage enclosure.

BRIEF DESCRIPTION OF THE DRAWINGS

These and other features of the present disclosure will become more fully apparent from the following description and appended claims, taken in conjunction with the accompanying drawings. These drawings depict only several embodiments in accordance with the disclosure and are not to be considered limiting of its scope. The disclosure will be described with additional specificity and detail through the use of the accompanying drawings. The following are brief descriptions of the drawings.

FIG. 3 is a perspective view of the first embodiment of the rapidly deploying transportable power system of FIG. 1, showing all of the solar panel frames positioned along a length of the rail system in a flat or ground level position.

FIG. 4 is a perspective view of the first embodiment of the rapidly deploying transportable power system of FIG. 1, showing all of the solar panel frames in a tilted position.

FIG. 21 is a perspective view of the embodiment of the track assembly shown in FIG. 20.

FIG. 22 is a perspective view of the embodiment of the load carrying device shown in FIG. 20.

FIG. 25 is a perspective view of an embodiment of a first or front bracket assembly.

FIG. 26 is a perspective view of an embodiment of a second or rear bracket assembly.

DETAILED DESCRIPTION

Figure 1:
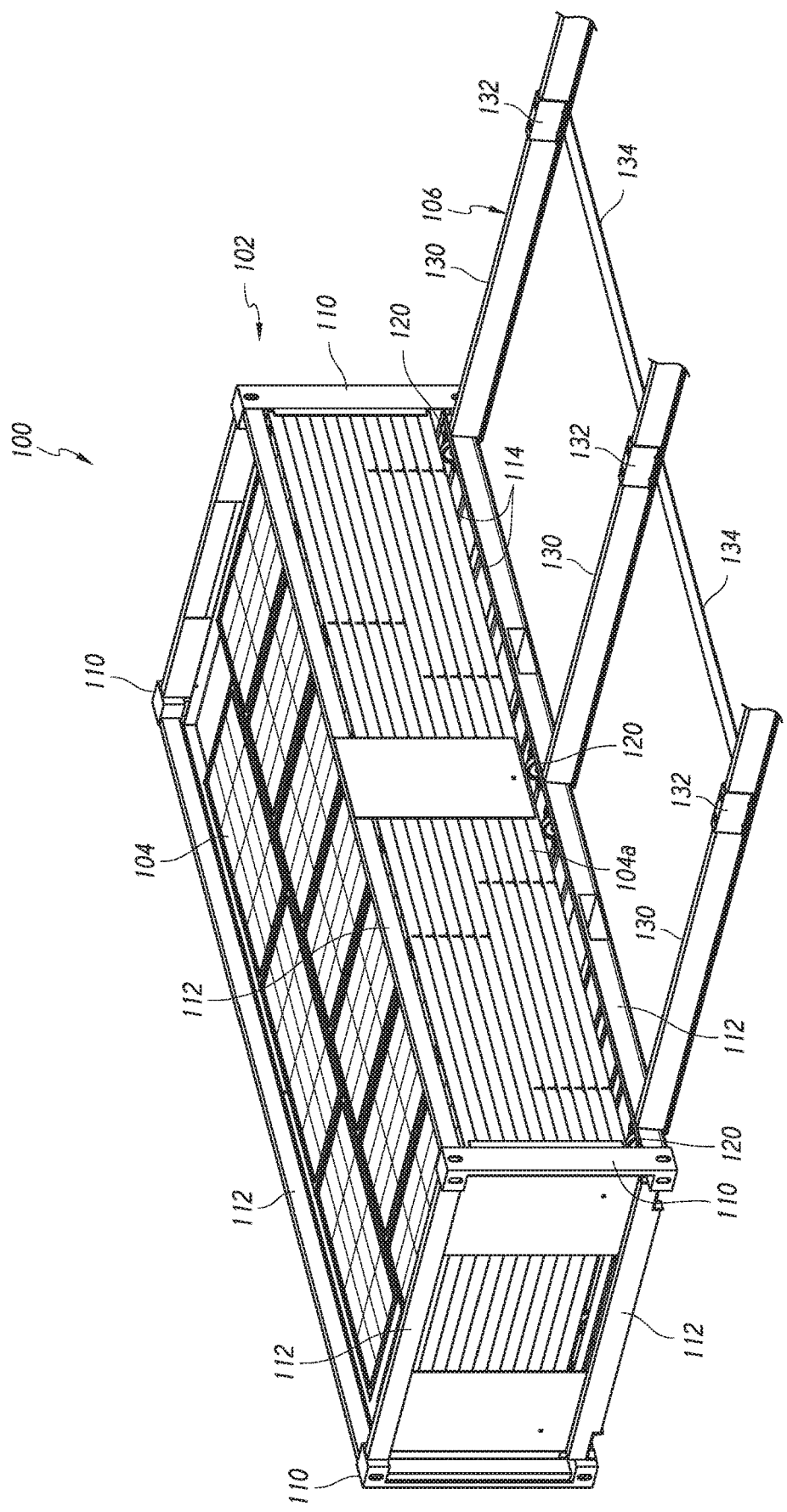
FIG. 1 is a perspective view of a first embodiment of a rapidly deploying transportable power system, showing all of the solar panel frames positioned within the transport enclosure.

Embodiments of systems, components, methods of assembly, and manufacturing details regarding deployable energy generation systems will now be described with reference to the accompanying figures, wherein like numerals refer to like or similar elements throughout. Although several embodiments, examples and illustrations are disclosed below, the inventions described herein extend beyond the specifically disclosed embodiments, examples and illustrations, and can include other uses of the inventions and obvious modifications and equivalents thereof, including combinations of any of the components, assemblies, methods, and other details disclosed herein. The terminology used in the description presented herein is not intended to be interpreted in any limited or restrictive manner simply because it is being used in conjunction with a detailed description of certain specific embodiments of the inventions. In addition, regardless of specific terms or language used herein, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Embodiments disclosed herein relate to rapidly deploying transportable power systems that can be used to provide power to regions that have or do not have ready access to other sources of electrical power. Any of the rapidly deploying transportable power system embodiments disclosed herein can have a rapidly deploying transportable support structure or transport enclosure that is used to support and enclose (at least partially) the other components of the rapidly deploying transportable power system during transport. In some embodiments, the transport enclosure can have structural similarities to a standard or modified ISO container or military container. The transport enclosure can also provide a support structure for the system upon deployment. The transport enclosure can be a high cube size or a standard height size, or even a 36-57 in tall, half-sized, size, where they are designed to stack one upon another, and can be sized and configured to be shippable by truck, air, sea, and rail.

Additionally, in any embodiments disclosed herein, the rapidly deploying transportable power system can be configured to be, or can be, positionable on a rooftop of a commercial, industrial or other building, on any building with a generally flat roof, or on any suitable rooftop of flat surface. For example and without limitation, crane systems, helicopters, and/or other suitable transport devices can be used to transport the rapidly deploying transportable power system to the rooftop. Further, and of the rapidly deploying transportable power system embodiments disclosed herein can be configured to be, or can be, positionable on top of other transportation containers, military containers, or other suitable structures.

In any embodiments disclosed herein, the support structure and/or transport enclosure can be closed on all eight sides, or can be open on any one or more of the eight sides. For example and without limitation, any of the support structure embodiments can be open on a top surface or top side thereof, and/or any of the long side or end sides or surfaces. A flexible or hard cover can be used to cover the components supported within the transport enclosure on the open sides thereof.

Some embodiments of the transport enclosure of any of the rapidly deploying transportable power system embodiments disclosed herein can be in the form and/or shape of a shipping container (such as, but without limitation, and ISO shipping container) that is approximately 10 foot long, approximately 20 foot long, approximately 40 foot long, or of any other desired size and/or shape. Additionally, any of the power system embodiments disclosed herein can have any suitable trailer, any suitable type of shipping container, or any suitable drop off skid platform to support and/or house the other components of the rapidly deploying transportable power system. In any embodiments disclosed herein, the transport enclosure can be approximately 57 inches tall, approximately 238 inches long, and approximately 96 inches wide.

Furthermore, any of the rapidly deploying transportable power system embodiments disclosed herein can be configured to work independently or in a modular fashion, such that a plurality of rapidly deploying transportable power systems can be interconnected to work as a system for providing any desired level or magnitude of energy output. Any of the rapidly deploying transportable power system embodiments disclosed herein can be completely or substantially completely prewired such that, upon deployment of the solar panel frames, the operator or installer will only need to join quick connectors between the frames and/or other components to electrically interconnect all of the components and subsystems of the solar power system, including the energy converter(s), controllers, optimizers, monitoring systems, communication systems, or energy storage components. Being prewired, the deployment and stowage of the solar power arrays will be much more efficient and can be done in a much shorter period of time, thus be capable of providing energy and a shorter period of time to the needed region as well as being able to stow the components of the system in a much shorter amount of time, which may decrease the overall cost of an operation but also potentially reduce the risk of damage to the system in the event that a system must be transported or at least stowed due to changing weather conditions, acts of war or sabotage, or otherwise.

Any of the rapidly deploying transportable power system embodiments disclosed herein can have any combination of one or more solar power panels or arrays in addition to any other suitable or desired energy collection, generation, or storage components or systems. For example, any of the rapidly deploying transportable power system embodiments disclosed herein can have any combination of solar power panels and/or wind turbines used to generate power.

Additionally, any of the rapidly deploying transportable power system embodiments disclosed herein can have one or more storage batteries (such as 10-20 kw/hr sub-modules configured in 24-48 VDC, which can be deep cycle lead acid or lithium iron phosphate, or otherwise) within each rapidly deploying transportable power system, or one or more storage batteries interconnected with a plurality of rapidly deploying transportable power systems. Additionally, any of the rapidly deploying transportable power system embodiments disclosed herein can have one or more controllers, microcontrollers, two-way radios, televisions, high voltage busses, inverters and/or electrical conversion components needed to convert the energy produced by the solar wind arrays into a form that can be transported and/or used in the region, including DC-DC and/or DC-AC power converters. Any of the rapidly deploying transportable power system embodiments disclosed herein can also have additional resource providing subsystems, such as, but not limited to, interior and exterior lighting, water purifiers or treatment systems, desalination systems, refrigeration, bio-fuel processing, algae growth production, communications systems, security and/or surveillance systems, disaster relief and/or medical device equipment, pump systems (for pumping water for water purifiers, flood relief, etc.) water distribution systems, communications systems when regional communication systems have been compromised, water heaters, and other subsystems and/or any combination of the systems disclosed herein. Additionally, any of the rapidly deploying transportable power system embodiments disclosed herein can also have one or more diesel fuel or other fossil fuel generators configured to provide a source of power to supplements the power generated by the other power generation sources.

Additionally, any of the rapidly deploying transportable power system embodiments disclosed herein can have frames that support multiple solar panels, the frames being shorter in length than the usable inside length of the transport enclosure such that there can be additional storage space inside the transport enclosure. For example and without limitation, in any embodiments disclosed herein, the frames can be approximately 192 inches wide, permitting storage or other usable space on either side, on one side only. In any embodiments, the frames can be generally centered in the transport enclosure so that there is storage space on both sides. As mentioned, this available space (referred to herein as component storage space) can be on one side of the container or be divided up to provide space on both sides of the frames in the container. This space can be used for positioning or supporting any of the following components during transport and/or operation of the transport enclosure and power generation systems disclosed herein: the deployment components (for example, without limitation, gantry and/or crane components, track or rail components, brackets and hinges for supporting the frames in the deployed state, etc.), batteries, air conditioning units, backup generators (including without limitation diesel fuel generators), converters, inverters, breakers, relays, wireless and wired communication systems, cables, connectors, optimizers, processors, control systems, battery charge controllers, alarms or other monitoring devices, jacks for lifting the panels, pumps, water treatment components, other systems and sub-systems disclosed herein, GPS equipment, solar tracking equipment, other suitable or desired components, and/or any combination of the systems and components disclosed herein. Please note also that any of the foregoing components can be used with, or combined with, any of the embodiments disclosed in this application, regardless of where such components are positioned in the storage container or otherwise. For example and without limitation, in any embodiments, the electrical components can be supported within the transport enclosure adjacent to one end of the transport enclosure, while the hardware, including but not limited to, crane and/or gantry components, jacks, crane or gantry batteries, brackets, and other components can positioned adjacent to an opposite end of the transport enclosure.

For example and without limitation, frames designed for a 20 foot long transport enclosure can have frames that are approximately 16 feet long, such that there can be 18 inches on either side of the frames that are positioned within the transport enclosure, or approximately 36 inches on one end of the frames and little to no space on the opposite end of the frames. Such space or spaces can be used to support any combination of the components listed above. The frames can have a thickness of approximately 3 inches.

The solar panels supported in the solar panel frames of any embodiments disclosed herein can be made from any suitable material or technology available. For example and without limitation, the solar panels can be thin film and can have mono or polycrystalline solar cells. In some embodiments, the solar panels can be gallium arsenide panels, can be water heating panels, and/or can be combined photovoltaic and water heating panels. In any embodiments disclosed herein, the solar panel frames can each support eight to ten 200 W-300 W mono or polycrystalline solar panels.

Any embodiments disclosed herein can additionally have one or more battery storage banks controlled by charge control instrumentation, electrical power conversion systems to provide various voltage, amperage, or operating frequencies with load switching controls and cable connections, an interior and exterior utility lighting capability, a back-up fossil fuel generator allowing hybridized power operating capability to run either a 24/7 constant and stable 1× power signature at limited or no daily fossil fuel consumption or to operate up to a maximum mode with all systems active during prime sunlight hours for up to 10× power output capability over a 4 to 8 hour period, and to support sufficient cargo space within the vehicle to operate other off-grid needed equipment in the form of pumps, water filtering, de-salinizing, water heating, refrigeration, bio-fuel processing, algae growth production, communications, food preparation, security surveillance, disaster relief medical equipment and the like.

Additionally, any of the rapidly deploying transportable power system embodiments disclosed herein can have any combination of one or more components and devices that contribute to the control and/or operation of the rapidly deploying transportable power systems. For example, any combination of control systems, X-Y solar tracking systems, GPS based solar tracking systems (with integrated solar charts and databases that identify the location of the sun for the power system), optical monitoring systems to track the sun, satellite or cellular communications systems, and storm and/or threat tracking and control systems can be integrated into any of the rapidly deploying transportable power system embodiments disclosed herein.

The satellite or cellular communications systems can be used to provide data to an off-site location or receive control commands or instructions from an off-site location. The storm and/or threat tracking and control systems can be used to move the solar panels and/or other energy generation components between a deployed position and a stowed or secured position, depending on the level of threat or risk posed by an impending storm, high wind condition, war related threat, or other condition. For example, any of the embodiments can be configured such that the solar panels and/or other energy generation components can be quickly and efficiently moves to a secured position which limits the exposed surface area of the solar panels and/or other energy generation components in the event of or prior to such events. For solar panels, the stowed position can be one in which all of the solar panels are moved to a flat, generally co-planar positioning configuration, or even where one or more of the solar panels are overlapped partially or completely to reduce the exposed surface area of the solar panels. The stowed position can also mean that the solar panels are withdrawn into the transport enclosure to provide additional safety and security to the solar panels.

Any of the rapidly deploying transportable power system embodiments disclosed herein can use any suitable type of solar panel. For example, high efficiency and/or high temperature solar panels manufactured like Panasonic or Sunpower, and solar panels by Trina Solar, Canadian Solar, or any other solar panel manufacturers can be used in any of the rapidly deploying transportable power system embodiments disclosed herein. In any embodiments disclosed herein, the solar panel frames can be foldable along one or more axes.

For example, any embodiments disclosed herein can be configured such that the solar panel frames can be tilted (generally about a horizontal axis) and/or rotated (generally about a vertical axis) to provide the greatest exposure to the sun. The solar panel frames can be positioned on a pedestal so as to be able to rotate about an axis that is perpendicular to the ground surface, as well as rotate about an axis that is horizontal to the ground surface to tilt the solar panel frame. Tilting can be achieved mechanically, such as by using a tilt jack, or by a screw drive and automatic control system, or otherwise. Rotation of the solar panel frames can be achieved in any of the embodiments disclosed herein by using a motor to rotate the frame about a shaft or axis points approximately in the middle of the panel, or by using a cable pulley system wherein the frame rotates on rollers about an arcuate or circular track.

Any embodiments of the rapidly deploying transportable power system disclosed herein can have a rail system positionable outside of the transport enclosure of the rapidly deploying transportable power system. The rail system can be assembled or pieced together outside of the transport enclosure and can be used to support the solar panel frames in an array or arrangement outside of the transport enclosure. For example and without limitation, in any embodiments disclosed herein, the rail system can have a plurality of rail members that can be positioned or supported within the transport enclosure during transport of the rapidly deploying transportable power system, and then pieced together or assembled outside of the transport enclosure when the transport enclosure has reached its desired location. The rail members can extend away from one of the sides of the transport enclosure (for example, without limitation, the long side of the transport enclosure) and can support the plurality of solar panel frames that were transported within the transport enclosure or otherwise. In any embodiments herein, the solar panel frames can actually be slid or rolled along the rail system to the desired location of the solar panel frame. In this arrangement, the rails serve as framework to support the solar panel frames in the desired locations, but also provide a structure for the transport of the solar panel frame from within the transport enclosure to the desired position. As such, one or both of the solar panel frames and the rail system can have wheels or can have slidable surfaces thereon to facilitate the translation of the solar panel frames along the rail system.

Alternatively, in any embodiments disclosed herein, the solar panel frames disclosed herein can be deployable without a rail system. In such configurations, the solar panel frames can be positioned on top of ground mounting platforms that can be sized and configured to support one solar panel frame, or two or more solar panel frames. Additionally, the solar panel frames can be positioned on, supported by, or deployed over any suitable raised platform.

In any embodiments disclosed herein, the rail system can be configured to be supported adjacent to a ground surface. Alternatively, in any embodiments disclosed herein, the rail system can have leg support that can elevate the rail system to any desired height off of the ground surface. In this arrangement, the solar panel frames can create a sun shade while also providing the solar power generation from the solar panel frames.

The leg supports can be vertically adjustable so as to adjust for uneven ground surfaces so that the rail members of the rail system can remain in a somewhat even and planar position. For example and without limitation, the leg supports can be from approximately 12 to approximately 96 or more inches long, or from approximately 12 to approximately 48 inches long, and/or adjustable to a height within any of these ranges. Additionally, in any embodiments disclosed herein, the rail system can be configured such that the solar panels form an overhead patio or covering of sorts that can be high enough off of the ground for a person to comfortably walk under in an upright, erect position.

The length of the rail members of the rail system can depend on the length of the support structure of the transport enclosure that is used to transport the rapidly deploying transportable power system components. For example and without limitation, in any embodiments herein wherein the transport enclosure is approximately 20 feet long, the rail system can comprise rail members each being approximately 18 feet long, or from approximately 12 feet long to approximately 20 feet long. In any embodiments disclosed herein, the rail system can comprise rail members each being from approximately 17 feet long to approximately 19 feet long. The rail members can be straight, angled, and/or curved. In any embodiments disclosed herein, the entire rail system can be approximately 120 feet long, which can provide spacing of approximately 4 feet between each of nine to fifteen solar panel frames (which can be approximately 8 feet wide—in the direction of the rail system). The spacing between each of the solar panel frames can provide the envelope of space needed to tilt and rotate the frames for solar tracking purposes. If the frames are laid flat, the rail system in any embodiment disclosed herein can be approximately 96 to 100 feet long, and the solar panel frames can be approximately 8 feet wide.

For example, in any embodiments herein, the rapidly deploying transportable power system can be configured such that, to deploy the solar panel frames, a single worker or a pair of workers can slide the solar panel frames out of the transport enclosure and onto the rail system. The solar panel frames can then be translated (rolled, slid, or otherwise moved) along the rail system to the distal location. As mentioned, the solar panel frames can be prewired such that little to no wiring is necessary to initiate the transmission of energy from the solar panel frames to the power grid or storage battery. The wiring can utilize high voltage DC interconnect cabling. In any embodiments herein, the solar panel frames can be listed out of the transport enclosure and onto the frame, and then moved to the desired distal location on the rail system. In any embodiments disclosed herein, the plurality of solar panel frames, which can be approximately 14 solar panel frames, or from 10 to 16 solar panel frames, can be deployed and the system made operational by two workers in approximately 2 hours under normal working conditions.

The rapidly deploying transportable solar power system embodiments disclosed herein are designed to provide the greatest amount of efficiency and power generation for the size of the structure or rapidly deploying transport enclosure. For example, the rapidly deploying transportable power system embodiments disclosed herein are configured to provide maximum power generation density within the transport enclosure or structure (which, in any embodiments herein, can be but is not required to be a modified container), meaning that the amount of power that can be generated from the components housed were supported within the support structure or transport enclosure is maximized. This can be achieved by not only increasing the efficiency of the individual solar panel arrays by selecting the highest efficiency panels, but also increasing the solar collection surface area of the panels transported within the structure or transport enclosure, and also increasing the efficiency of the energy collection of each panel by adjusting and positioning the location and orientation of the panels to be the most efficient (i.e., by maximizing the effective surface area of the panels exposed to the sun).

In any embodiments disclosed herein, any of the rapidly deploying transportable power systems can be configured such that 14 or more, or from 8 to 16 solar panel frames, are supportable within or by the transport enclosure. In any embodiments disclosed herein, the transport enclosure can support ten solar panel frames, each solar panel frame supporting nine solar panels. In any embodiments, the solar panels can be approximately 62.2 inches long and approximately 31.8 inches wide, or approximately 62 inches long and approximately 32 inches wide, or from approximately 30 inches wide to approximately 36 inches wide, and from approximately 60 inches long to approximately 72 inches long. In any embodiments disclosed herein, the solar panel frames can have nine solar panels, each being approximately 62.2 inches long and approximately 31.8 inches wide.

Additionally, in any embodiments disclosed herein, the solar panel frames can each support one or more solar panel optimizers. For example, in any embodiments, the solar panel frames can support one optimizer for every solar panel supported by the frame, or one optimizer for every two solar panels supported by the frame.

Any deployable solar power system embodiments disclosed herein can have one or more inverters also. The inverters can have optimizers integrated into the inverters. There are many different configurations of breakers, connectors, optimizers, inverters (which can include, without limitation, string inverters, micro inverters, or other inverters), converters, load switching controls, battery systems, data logging systems and components, web monitoring systems and components, and other electronics that can be used with any of the solar power system embodiments disclosed herein, any of which can be included in any of the solar generation embodiments disclosed herein. In many cases, the electronic components, battery systems, and other components included in a system will depend on the desires and requirements of the end-user. The electronic components and other components and configurations of the systems disclosed herein can also depend on whether or not the system will be used for off grid applications, on grid applications, or hybrid applications.

Inverters and/or converters manufactured by, without limitation, SOLAREDGE, SMA Solar Technology AG, VOLTACON (such as the HSI10000 48VDCHybrid 10 KW three phase solar inverter), SCHNEIDER ELECTRIC, and/or ABB can be included with or integrated into any of the solar power system embodiments disclosed herein. Additionally, for example and without limitation, if an end-user prefers to use the system for on-grid applications, SOLAREDGE inverters and SOLAREDGE (TM) Power Optimizers can be included with or integrated into any of the solar power system embodiments disclosed herein. SOLAREDGE optimizers can include performance monitoring systems integrated into the optimizers, which can be used with any embodiments of the systems disclosed herein to monitor and enhance the performance of the solar panels and modules. If an end-user prefers to use the system for off-grid or hybrid applications, ALENCON DC to DC optimizers or TIGO (TM) optimizers, such as the TIGO (TM) TS4-0 and TS4-L optimizers, BM SOLAR optimizers, and/or Enphase Microinverters (by Enphase Energy, Inc.) can be included with or integrated into any of the solar power system embodiments disclosed herein. Additionally, battery charge controllers, such as the FLEXMAX 60/80 manufactured by OUTBACK POWER (TM) can be included with or integrated into any of the solar power system embodiments disclosed herein.

For monitoring and/or logging power and energy consumption and/or production, any of the following monitoring components can be included with or integrated into any of the solar power system embodiments disclosed herein. These include, but are not limited to, the ACUVIM-L series multifunction power meters, the HOBO Plug Load Data Logger (part no. UX120-018), the HORIZON FUEL CELL TECHNOLOGIES Renewable Energy Monitor, the Neurio W1-HEM Home Energy Monitor, and/or the SCHNEIDER ELECTRIC METSEPM5330 Power Meter.

All of the solar panels of each solar panel frame can be completely wired together such that there is only one wiring harness, which can have a quick connect or disconnect plug, on the inputs and or the output side of each solar panel frame.

Figure 2:
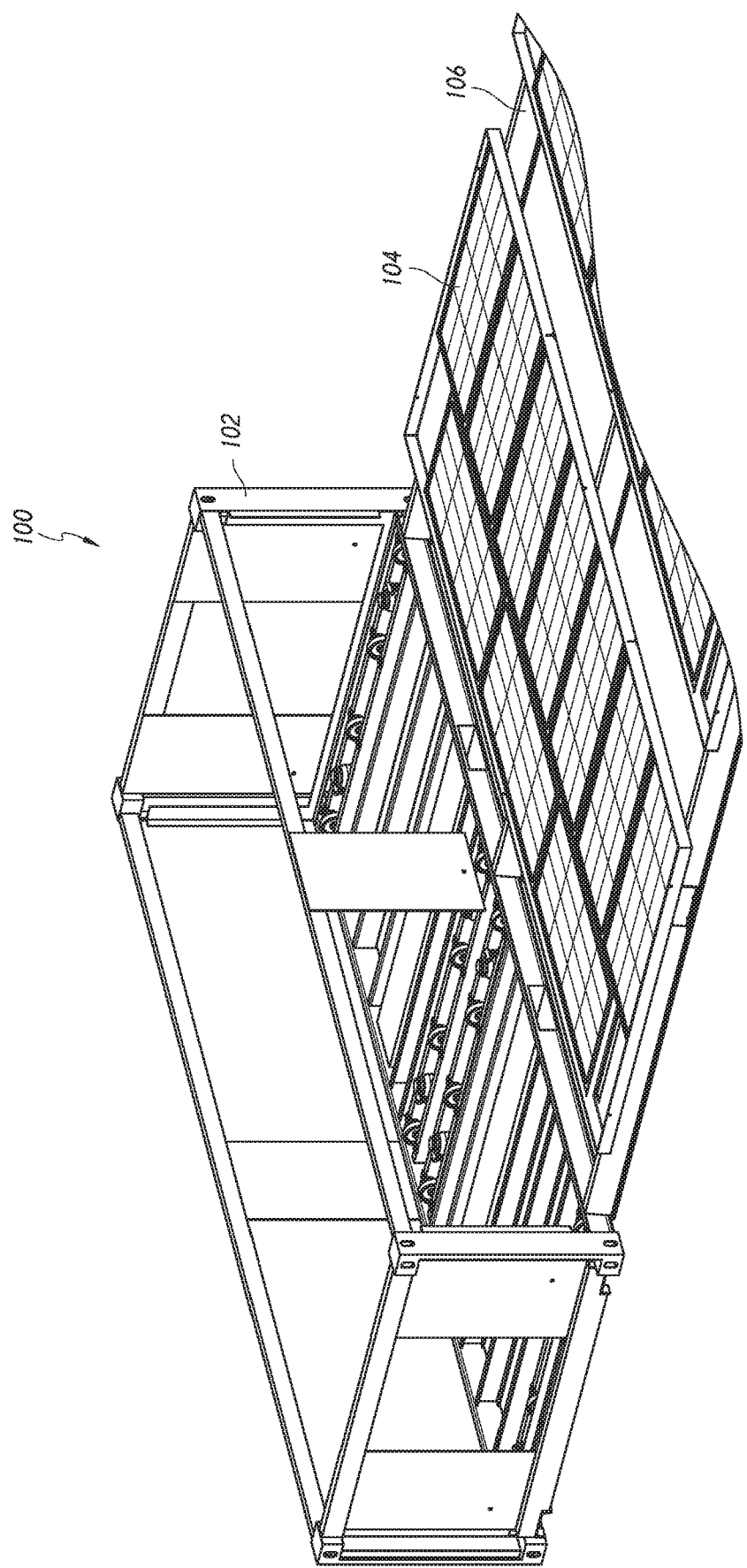
FIG. 2 is a perspective view of the first embodiment of the rapidly deploying transportable power system of FIG. 1, showing all of the solar panel frames positioned outside of the transport enclosure.

In any embodiments of the rapidly deploying transportable power systems disclosed herein, the rapidly deploying transportable power system can be deployed from this stowed or transport state (also referred to herein as the first state) to be deployed or energy generating state (also referred to herein as the second state) by two workers. FIG. 1 is a perspective view of a first embodiment of the rapidly deploying transportable power system 100. FIG. 2 is a perspective view of the first embodiment of a rapidly deploying transportable power system 100 of FIG. 1, showing all of the solar panel frames 104 positioned outside of the transport enclosure 102. FIG. 3 is a perspective view of the first embodiment of the rapidly deploying transportable power system 100 of FIG. 1, showing all of the solar panel frames 104 positioned along a length of the rail system 106 in a flat or ground level position. FIG. 4 is a perspective view of the first embodiment of the rapidly deploying transportable power system 100 of FIG. 1, showing all of the solar panel frames 104 in a tilted position.

The rapidly deploying transportable power system 100 can have a transport enclosure 102, a plurality of solar panel frames 104, and a rail system 106 that can be positionable outside of the transport enclosure 102 so as to extend away from the transport enclosure 102. During transport, the rail system 106 can be positioned completely within the transport enclosure. Additionally, during transport, the solar panel frames 104 can also be positioned completely within the transport enclosure. In any embodiments disclosed herein, each solar panel frame can comprise a plurality of solar panels in any desired arrangement.

After the embodiments of the rapidly deploying transportable power system 100 has been delivered to the desired location, the components of the frame can be removed from the transport enclosure and assembled on the ground surface adjacent to the transport enclosure. As can be seen, the transport enclosure can be configured such that all of the desired solar panel frames, rail system members, and other components needed for the mobile solar power system can be contained and transported within the transport enclosure or transport enclosure 102. Additionally, in any of the embodiments disclosed herein, the solar panel systems can be deployed with wiring and power conversion circuitry already attached to the panels such that, when the solar panels are deployed in the desired positions, no additional electrical connectivity or wiring, other than maybe simple connections, must be performed to operate the solar panel system.

In any embodiments disclosed herein, the transport enclosure 102 can be approximately 10 feet long, approximately 20 feet long, approximately 40 feet long, or otherwise. The height of the transport enclosure can be approximately 57 inches, or from approximately 55 inches to approximately 60 inches, or otherwise. In any embodiments disclosed herein, the transport enclosure 102 or any transport enclosure embodiments disclosed herein can have any number of vertical support members 110, and any number of horizontal support members 112 additionally, the transport enclosure 102 can have a plurality of lower support members 115 spanning across a bottom surface of the transport enclosure.

In the embodiment illustrated in FIG. 1, the transport enclosure 102 can support a plurality of wheels or rollers 120 configured to permit the solar panel frames 104 to roll out of the transport enclosure and onto the rail system 106. For example, the lowermost solar panel frame 104a of the stack of the plurality of solar panel frames 104 can roll or translate relative to the roller 120 and out of the transport enclosure 102 and onto the rail system 106.

Any arrangements or variations of the rapidly deploying transportable power system 100 can be configured such that one or more of the solar panel frames 104 can be supported in a vertical direction, so as to reduce the weight or force that is exerted on the lowermost solar panel frame 104a. For example, in any embodiments, lifting mechanisms can be used to support all of the solar panel frames positioned above the lowermost solar panel frame 104a when the solar panel frames 104 are in the transport enclosure. In this arrangement, the lowermost solar panel frame 104a can be removed from the stack of solar panel frames through a slot or opening in the transport enclosure 102. Each time the lowermost solar panel frame 104a is removed from the transport enclosure 102, the lifting mechanism can release the then lowermost solar panel frame 104a of the stack and support all of the solar panel frames above the new lowermost solar panel frame 104a so that the new lowermost solar panel frame 104a can be removed from the transport enclosure 102.

To pack the solar panel frames back into the transport enclosure, the solar panel frames can be passed through the slot while the solar panel frames within the transport enclosure are supported in a raised position. Once the newly inserted solar panel frame is advanced into the transport enclosure, the other solar panel frames within the transport enclosure can be lowered to be in contact with the newly inserted solar panel frame, and then the entire stack can be raised so that a new solar panel frame can be advanced into the transport enclosure.

In any embodiments disclosed here, the rapidly deploying transportable power systems can be configured such that the solar panel frames can be removed from any one of the sides and/or ends of the transport enclosure. For example and without limitation, the rapidly deploying transportable power system can be configured such that the solar panel frames can be removed from either or both of the sides of the support structure or transport enclosure. Additionally or alternatively, the rapidly deploying transportable power system can be configured such that the solar panel frames can be removed from either or both of the ends of the support structure or transport enclosure. Additionally, any of the rapidly deploying transportable power system embodiments disclosed herein can be configured such that any of the solar panel frames supported within the transport enclosure can be lifted, tilted, or rotated out through a top of the transport enclosure.

Once the solar panel frames 104 have been removed from the transport enclosure, the solar panel frames can be moved to the desired position along the rail system 106. The rail system 106 can comprise a plurality of rail members 130 which can be transported within the transport enclosure 102 and assembled outside of the transport enclosure 102 during deployment of the rapidly deploying transportable power system 100. The rail system can also have coupling members 132 which can be used to couple the real members and to and to provide a substantially continuous rolling or real structure for the solar panel frames. Additionally, lateral support members 134 can be positioned between the rail lengths to provide additional strength, support, and uniform spacing between the rail lengths. Any of the members of the rail system can be made from steel, including corrosion resistant or completed steel, aluminum, a composite material such as a fiber reinforced plastic including a carbon fiber material, or any other suitable material or combination of materials. In any embodiments disclosed herein, the rail members 130 can have an I-beam shape, a rectangular tubular shape, or any other desired structural shape.

As each solar panel frame is deployed from the transport enclosure, it can be supported on trolleys or sliding or rolling carriages, or sliding or rolling element supported by the rail system or the solar panel frames to move each solar panel frame to the desired position along the length of the rail system. FIG. 3 shows the solar panel system after all the solar panels have been moved to the desired position along the length of the rail system, and wherein each solar panel frame has been positioned in a desired angular orientation so as to maximize the exposure of the solar panel frame.

Alternatively, in some embodiments, as illustrated in FIGS. 5-8, the solar panel frames can be deployed from the transport enclosure using a hoist or crane assembly 250 (also referred to herein, with respect to any of the embodiments disclosed herein, as a lift device) configured to lift the uppermost solar panel frame 204a out of the transport enclosure and place uppermost solar panel frame 204a onto the rail system. After the solar panel frames have been moved from the transport enclosure and onto the rail system, sliders, rollers, trolleys, carriages, or other mechanisms can be used to move the solar panel frames to the desired position along the length of the rail system.

In any of the embodiments disclosed herein, any of the cranes, gantry cranes, and other components used for operation and/or deployment of the solar power generation systems can be battery powered. In any embodiments, the cranes can be powered by 12 volt batteries. For example, each of the two cranes used in some of the solar power system embodiments disclosed herein can be powered by a 12 volt 34ah lithium battery. Additionally, any of the cranes disclosed herein can be hand powered or can have electrical motors to power the cranes. The ½ ton capacity crane by PITTSBURGH can be modified to have an electric motor to power the crane and modified for mounting to the transport enclosure to lift the solar panel frames and other components from the transport enclosure.

Figure 5:
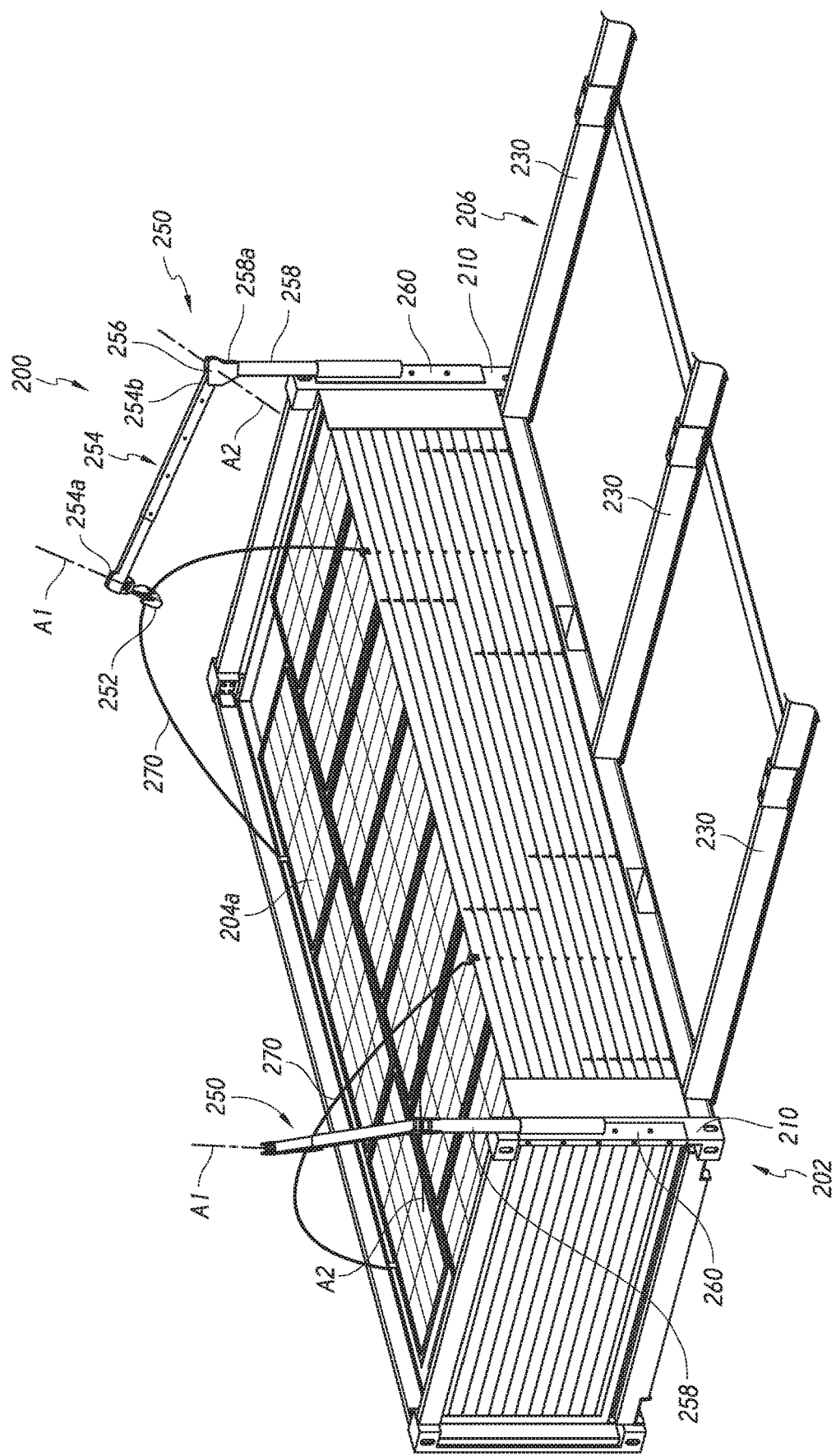
FIG. 5 is a perspective view of another embodiment of a rapidly deploying transportable power system, showing all of the solar panel frames positioned within the transport enclosure and showing a first crane system and a second crane system coupled with the uppermost solar panel frame.
Figure 6:
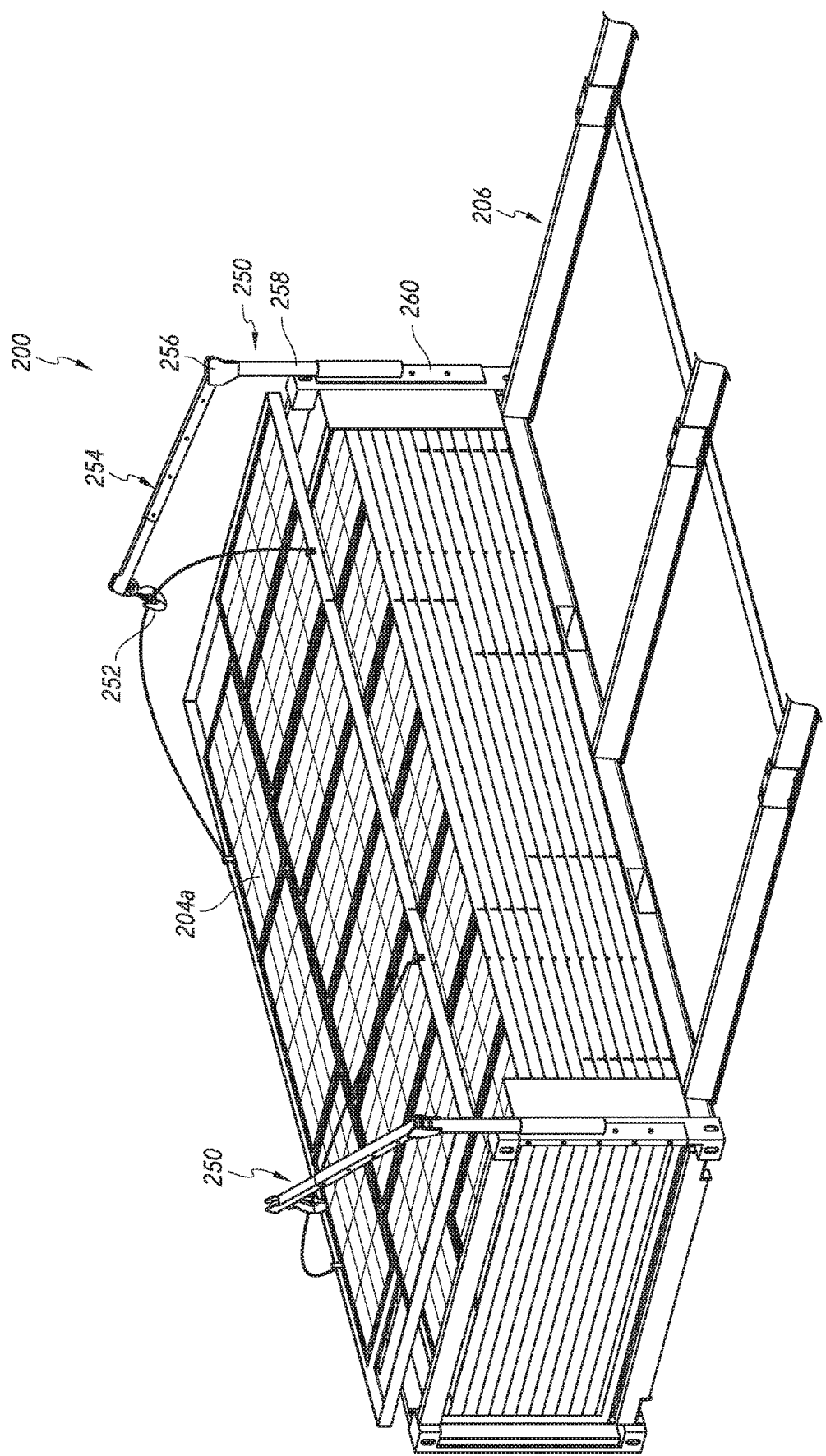
FIG. 6 is a perspective view of the embodiment of the rapidly deploying transportable power system of FIG. 5, showing the crane system lifting the uppermost solar panel frame in a vertical direction away from the other solar panel frames.
Figure 7:
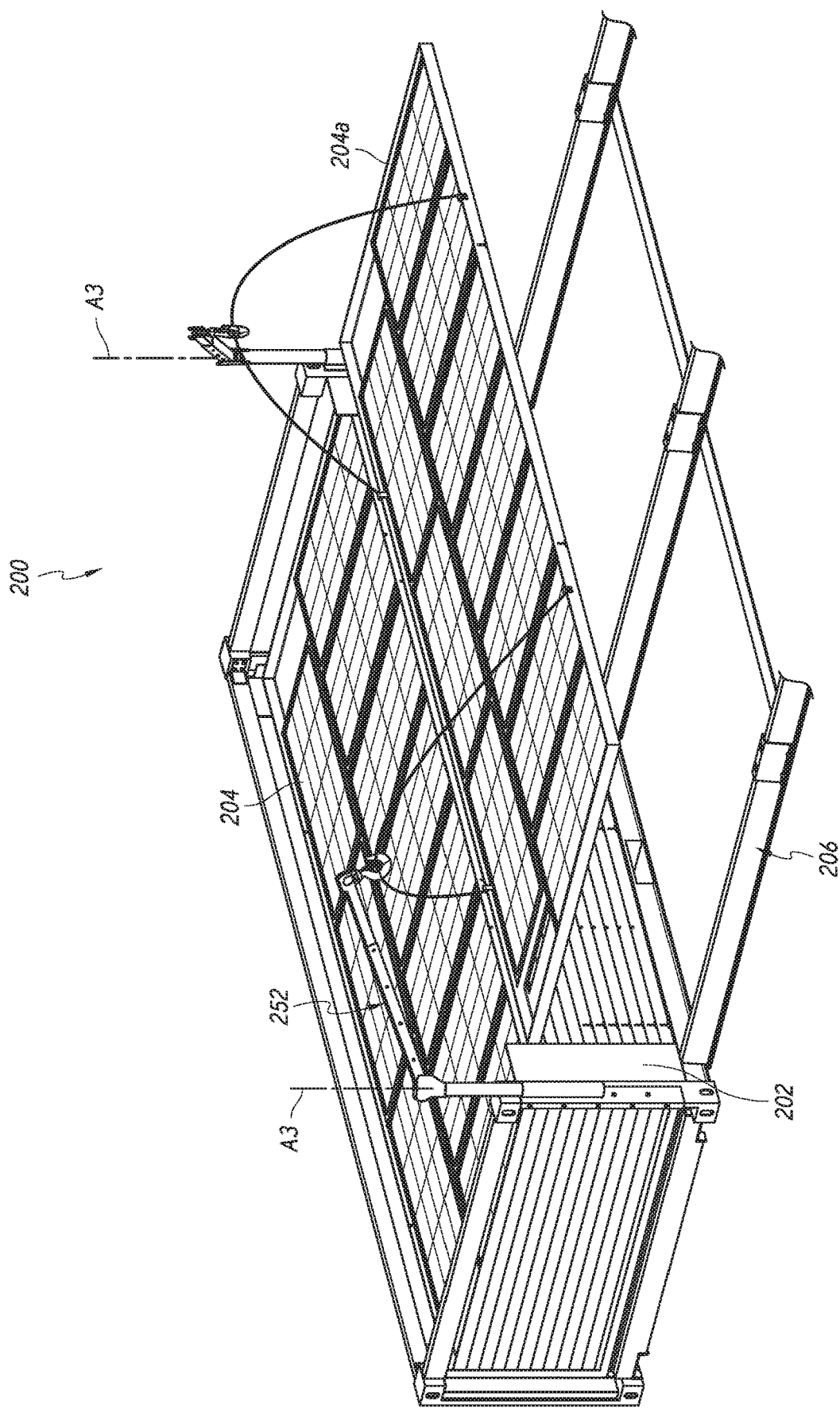
FIG. 7 is a perspective view of the embodiment of the rapidly deploying transportable power system of FIG. 5, showing the crane system moving the uppermost solar panel frame out of the transport enclosure toward the rail system.
Figure 8:
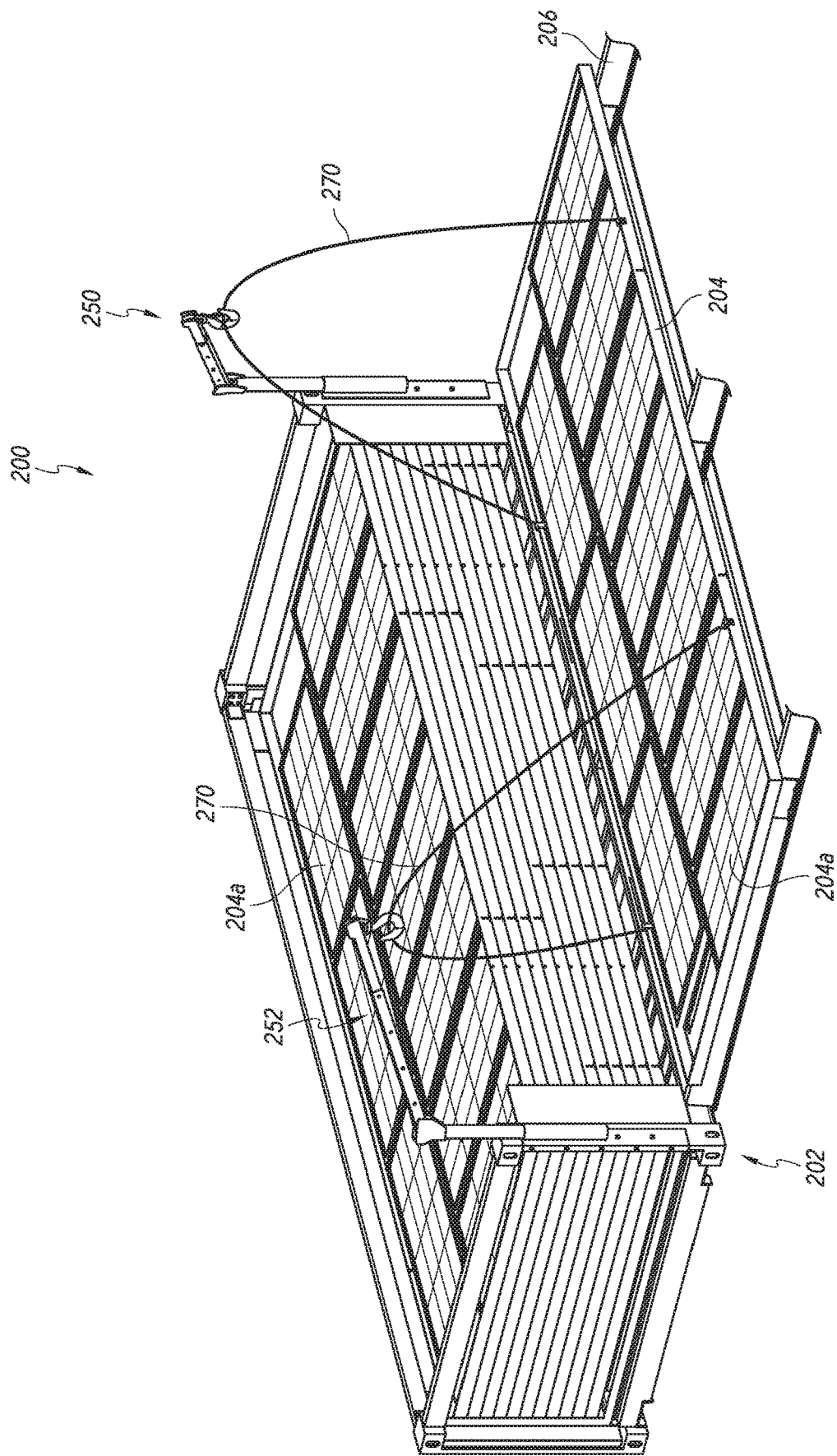
FIG. 8 is a perspective view of the embodiment of the rapidly deploying transportable power system of FIG. 5, showing the solar panel frame supported by the rail system after the solar panel frame has been lowered onto the rail system.

FIG. 5 is a perspective view of another embodiment of a rapidly deploying transportable power system 200, showing all of the solar panel frames 204 positioned within the transport enclosure 202 and showing a first crane system 250 and a second crane system 250 coupled with the uppermost solar panel frame 204a. FIG. 6 is a perspective view of the embodiment of the rapidly deploying transportable power system of FIG. 5, showing the crane systems 250 lifting the uppermost solar panel frame 204a in a vertical direction away from the other solar panel frames 204. FIG. 7 is a perspective view of the embodiment of the rapidly deploying transportable power system 200 of FIG. 5, showing the crane systems 250 moving the uppermost solar panel frame 204a out of the transport enclosure 202 toward the rail system 206. FIG. 8 is a perspective view of the embodiment of the rapidly deploying transportable power system of FIG. 5, showing the solar panel frame 204 supported by the rail system 206 after the solar panel frame 204 has been lowered onto the rail system 206.

The rapidly deploying transportable power system 200 can be configured to support any desired number of solar panel frames. With reference to FIGS. 5-8, the rapidly deploying transportable power system 200 can support 13 solar panel frames therein. Without limitation, the rapidly deploying transportable power system 200 can configured to support from approximately 8 or less to approximate 16 or more solar panel frames 204, or from approximately 11 to approximately 15 solar panel frames 204. In any embodiments disclosed herein, the thickness of the solar panel frames can be approximately 3 inches, or from approximately 2 inches to approximately 6 inches. The frames can be made from a robust and structurally rigid material that can withstand sun and heat exposure, as well as withstand damage from other elements that the frames may be exposed to. Additionally, in some embodiments, the frames can be approximately 400 pounds, or from approximately 350 pounds to approximately 450 pounds, or from approximately 350 pounds or less to approximately 650 pounds or more.

Any of the embodiments of the rapidly deploying transportable power system disclosed herein, including without limitation rapidly deploying transportable power system 200, can have any of the features, components, and/or other details of the rapidly deploying transportable power system 100, in combination with any of the features, components, or other details of the newly disclosed rapidly deploying transportable power system embodiments. Therefore, it is to be understood that this disclosure contemplates any combination of the features, components, and/or other details of any of the rapidly deploying transportable power system embodiments disclosed herein.

With reference to FIGS. 5-8, any embodiment of the crane systems can have a hook that can removably coupled with a wire or cable on each end of the solar panel so that one or a plurality of hoists or cranes (such as a pair of hoists or cranes, as shown in the figures) can lift the solar panels out of the transport enclosure and onto the frame assembly. The cable or wire can be removably coupleable with the solar panel frame and/or can be removably coupleable with the hoist or crane assembly. The crane systems can be mechanically operated, such that the crane can be rotated to move the solar panel frames to the desired position, and can be cranked to lift the solar panel frame in the vertical direction.

In any embodiments, each crane system can have a hook or coupling member 252 attached or coupled with an end of an extendable arm support 254. The extendable arm support 254 can be adjustable in length to accommodate different size solar panel frames or different positions of the coupling member 252 to position the coupling member near the approximate centerline of mass of the solar panel frames 204 for balancing the frames 204 as they are being lifted and moved out of or into the transport enclosure 202. The coupling member 252 can be configured to swivel or rotate about an axis that is approximately normal to a distal end portion 254a of the support arm 254. This axis is represented by A1 in FIG. 5.

The arm support 254 can extend from a coupling member 256 that can form a joint between the arm support 254 and vertical support arm 258. A proximal end 254b of the arm support 254 can be supported by the coupling member 256. A vertical support member 258 can be coupled with the coupling member 256 at a distal end 258a of the vertical support member 258. Additionally, the vertical support member 258 can be coupled with a support bracket 260 that can be used to couple the vertical support arm 258 with a vertical member 210 of the transport enclosure 202.

The crane system 250 can be configured to permit the distal end portion 254a of the arm support 254 to rotate relative to the coupling member 256 such that the distal end portion 254a of the arm support 254 and, hence, the coupling member 252 and solar panel frames can be lifted. With reference to FIG. 5, the arm support 254 can be configured to rotate about an axis A2 that is parallel to the ground surface. The coupling member 256 can be configured to support the arm in a fixed desired angular orientation, even under the load that can be exerted on the crane system 250 when lifting the solar panel frames.

With reference to FIG. 6, in any embodiments, the crane system 250 can have a lifting system or mechanism configured to raise and lower either the entire arm support 254 or just the distal end 254a of the arm support. For example and without limitation, the crane system 250 can have a crank system or other adjustability mechanism to permit the distal end portion 254a of the arm support 254 to be raised and lowered either manually or automatically. A motor driven gear system can be used to rotate the arm support 254 to raise and lower the distal end portion 254a of the arm support 254. Motor driven gear system can be supported by or within the coupling member 256.

Alternatively, the lifting system or mechanism can be configured to raise the vertical support arm 258 relative to the bracket member 260 so as to also raise the entire arm support 254, including the distal end portion 254a of the support arm 254 and, hence, the coupling member 252 and one or more solar panels 204, including an uppermost solar panel 204a. The lifting system or mechanism can comprise any combination of hydraulic components, mechanical arm and crank components, gear systems, and motor systems to manually and/or automatically raise and lower the arm support 254 or just the distal end portion 254a of the arm support.

A strap or cable member 270 can be removably attachable to the solar panel frames 204 and be coupled with the coupling member or 252 positioned at the distal end portion 254a of the arm support 254. In this configuration, by lifting the coupling member 254, the lifting force resulting from lifting the coupling member 254 can be exerted on the solar panel frames 204.

With reference to FIG. 7, in any embodiments, the crane system 250 can have a rotational system or mechanism configured to rotate the entire arm support 254 or just the distal end 254a of the arm support so as to change the X-Y position of the coupling member 252 relative to the transport enclosure 202. For example, with reference to FIG. 7, after the uppermost solar panel frame 204a has been lifted vertically so as to clear the highest vertical point or surface of the transport enclosure 202, the crane systems 250 can be configured to rotate or can rotate about a vertical axis so as to move or translate the solar panel frame 204 from the transport enclosure 202 to the rail system. The vertically oriented rotational axis is represented by A3 in FIG. 7.

The rotational system or mechanism can comprise any combination of hydraulic components, mechanical arm and crank components, gear systems, and motor systems to manually and/or automatically rotate the distal end portion 254a of the arm support and, hence, the coupling member 202 and the solar panel frame 204. As shown in FIG. 8, when the solar panel frame 204 has clear the transport enclosure and is positioned in the desired position above the rail system 206, the solar panel frame 206 can be lowered onto the rail system 206. Thereafter, the cable member 270 or cable members 270 can be removed from the solar panel frame, and the solar panel frame can be moved along the rail system to the desired location. Thereafter, the support arms 254 of the crane systems 250 can be rotated to the desired position above the next uppermost solar panel frame 204a, and the cable members 270 can be attached to the next uppermost solar panel frame 204a. The cable members 270 can have quick release or even hooked shaped connectors or members that can quickly engage with openings, fasteners, or other features of the solar panel frames 204. In any embodiments disclosed herein, the crane system 250 can be configured to lift and/or move two or more solar panel frame simultaneously and transport the two or more solar panel frames from the transport enclosure 202 to the rail system 206.

Any embodiments of the rapidly deploying transportable power system can have other mechanisms to remove the solar panel frames from the transport enclosure. For example, a rail and roller system, a gantry system, or other systems can be used in conjunction with a lifting system to remove the solar panel frames from the transport enclosure and position the solar panel frames on the rails system. In any embodiments, the solar panel frames can be removed and deployed from the transport enclosure using a gantry system configured to lift the uppermost solar panel frame out of the transport enclosure, move the solar panel frame along the gantry rail, and lower the solar panel frame onto the rail system or assembly. Once on the rail system, sliders, rollers, wheels, trolleys, and/or carriages can be used to move the solar panel to the desired position along the length of the frame assembly.

In any embodiments, the height of the gantry rail can be adjusted by moving the gantry rail vertically (in either a first direction upward or a second direction downward) relative to the top of a support structure or transport enclosure using sliders, carriages, bolts, hydraulics, or other mechanical components or systems to move and/or secure the gantry rail to the side of the transport enclosure in the desired vertical location. Additionally, the one or more cables that attach to the solar panel frame and permit the gantry system to engage or couple with the solar panel can be adjusted in length during the deployment to raise or lower the solar panel frames relative to the transport enclosure and the frame assembly.

Figure 9:
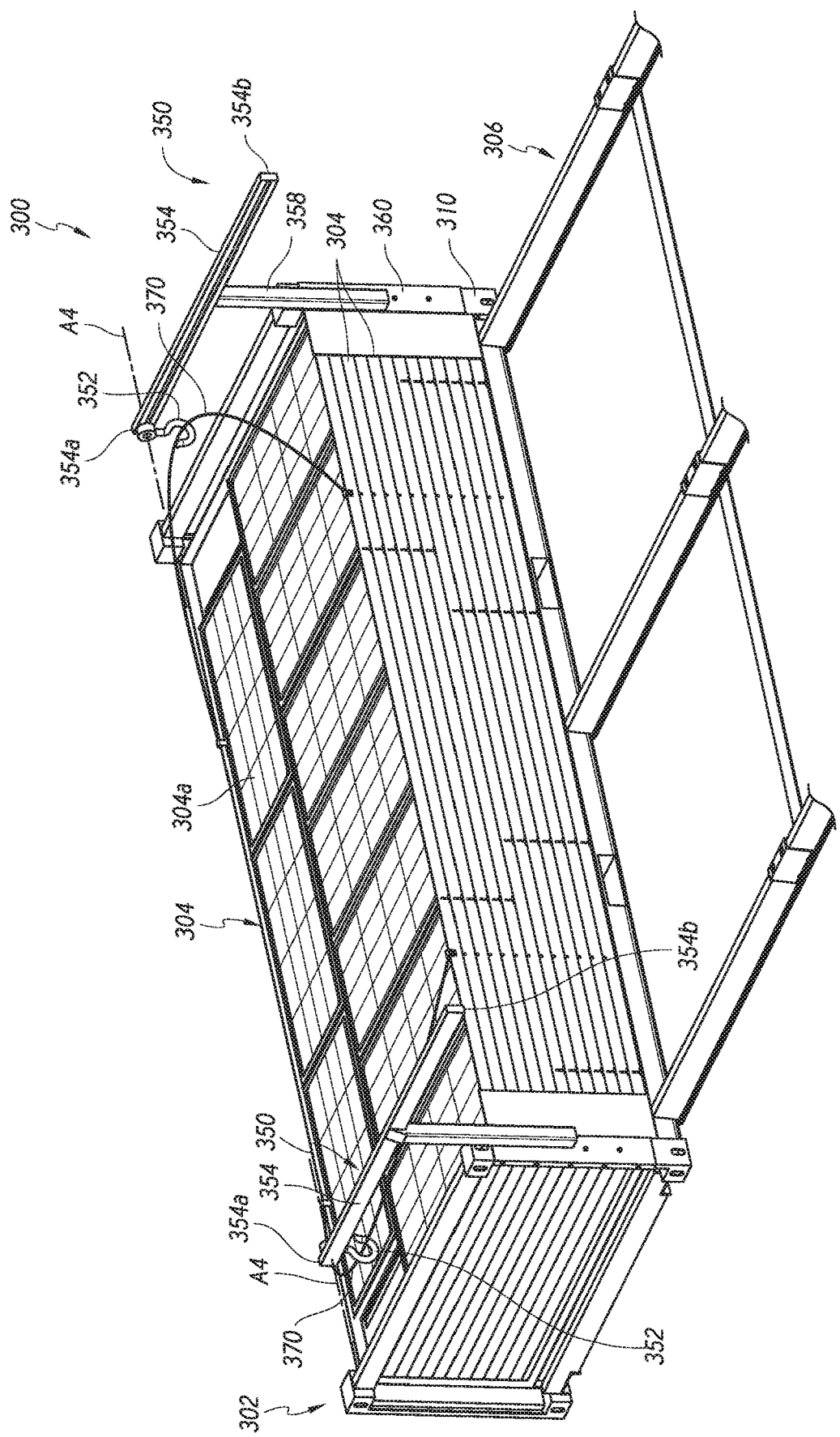
FIG. 9 is a perspective view of another embodiment of a rapidly deploying transportable power system, showing all of the solar panel frames positioned within the transport enclosure and showing a first gantry system and a second gantry system coupled with the uppermost solar panel frame.
Figure 10:
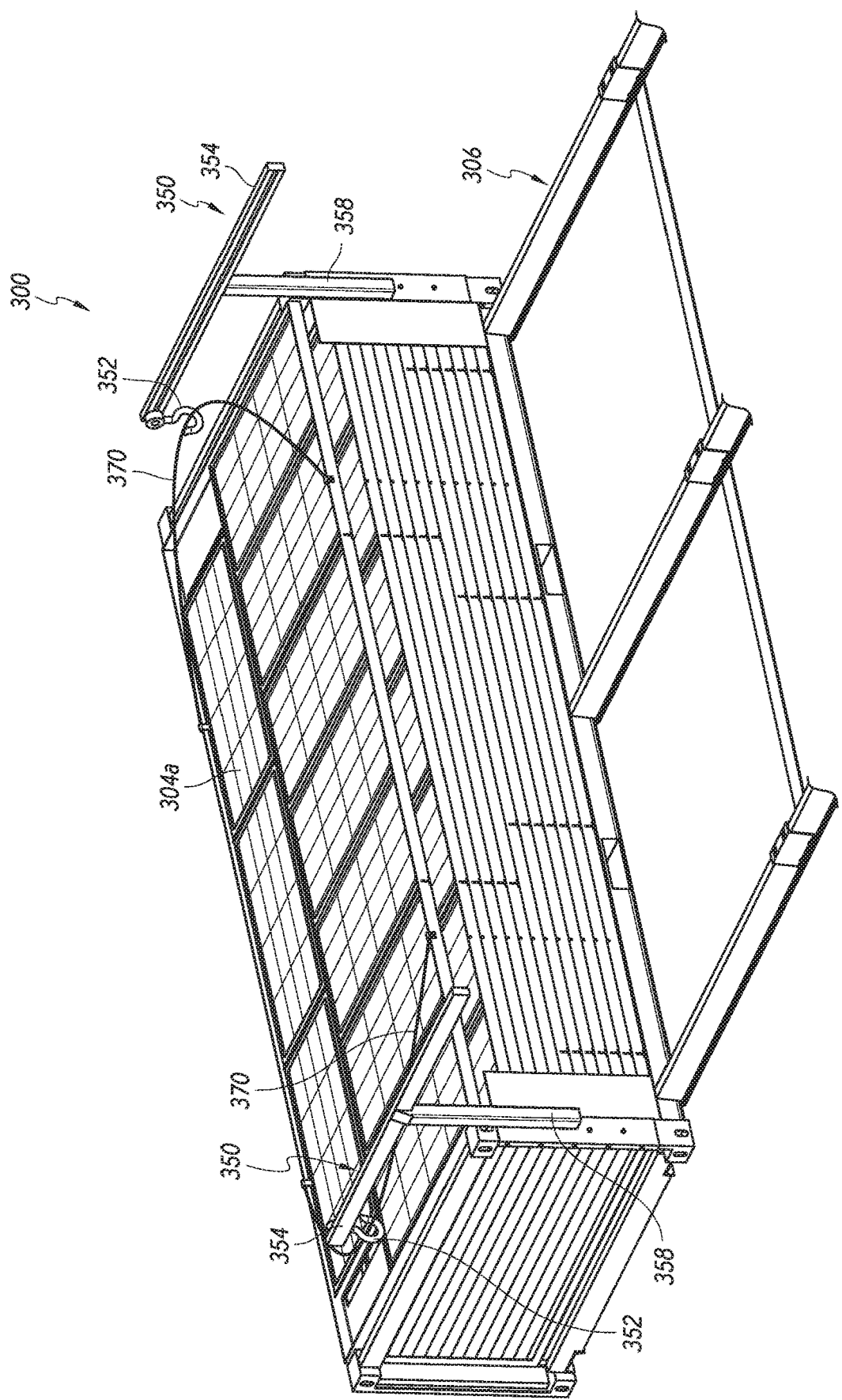
FIG. 10 is a perspective view of the embodiment of the rapidly deploying transportable power system of FIG. 9, showing the gantry system lifting the uppermost solar panel frame in a vertical direction away from the other solar panel frames.
Figure 11:
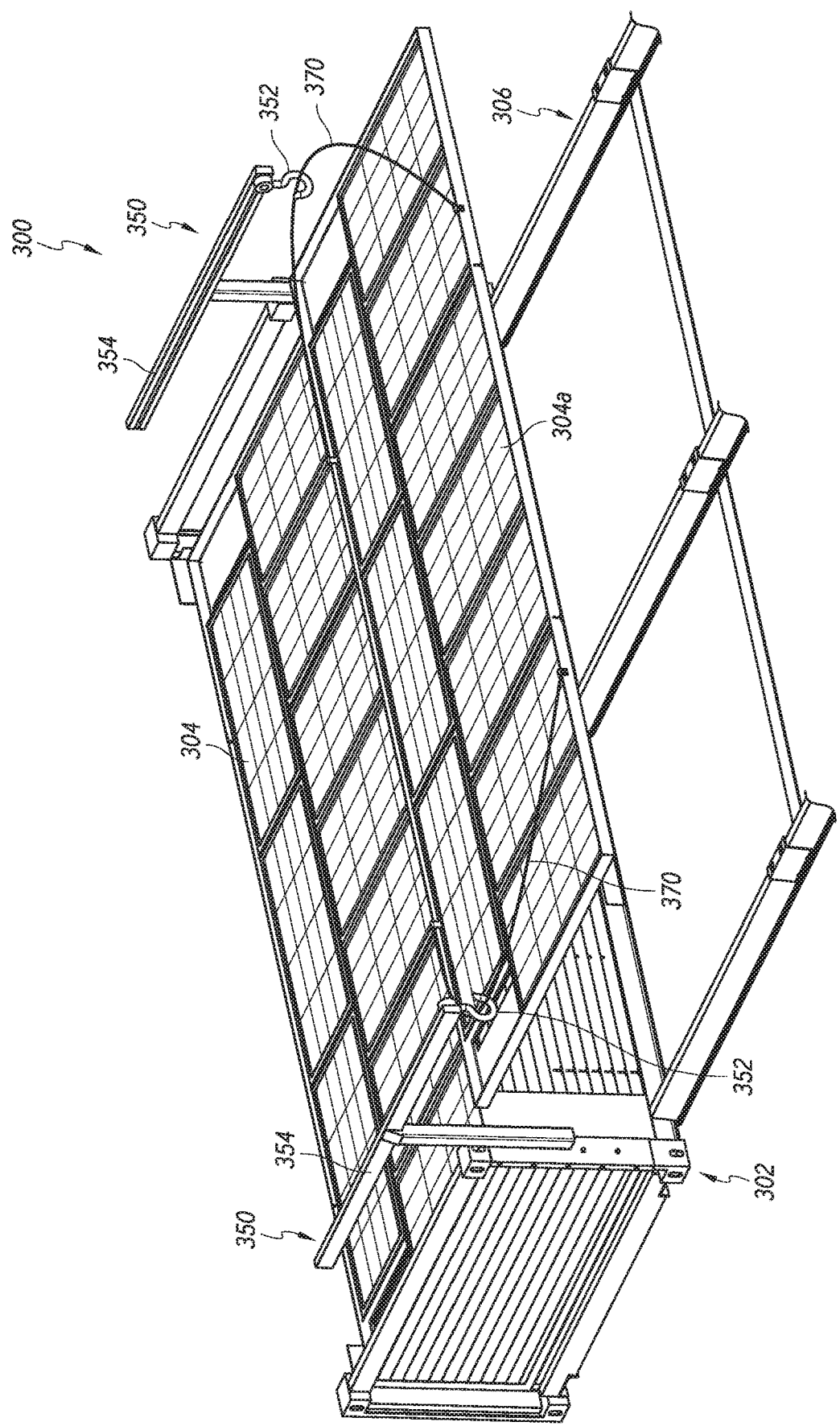
FIG. 11 is a perspective view of the embodiment of the rapidly deploying transportable power system of FIG. 9, showing the gantry system moving the uppermost solar panel frame out of the transport enclosure toward the rail system.
Figure 12:
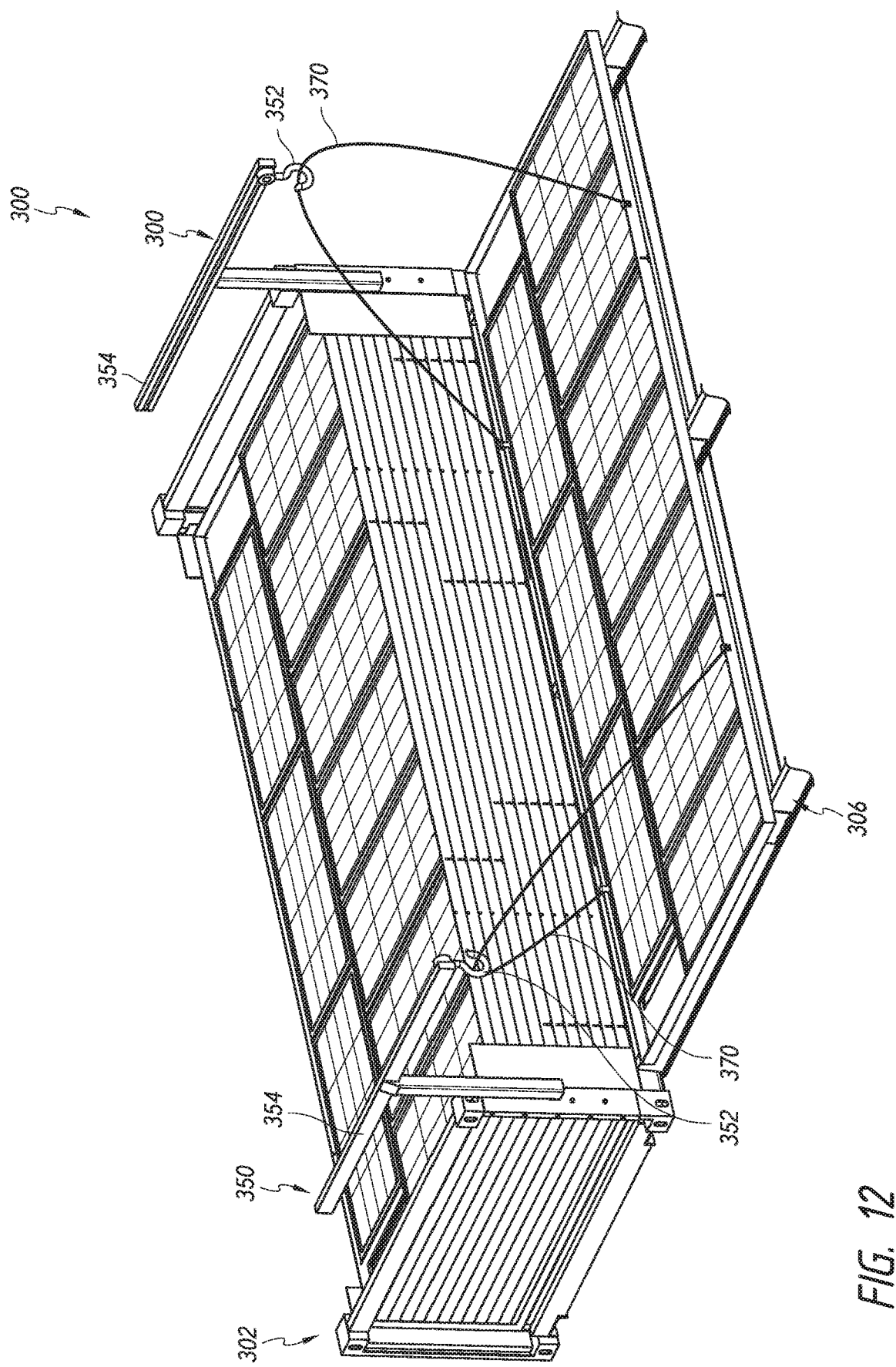
FIG. 12 is a perspective view of the embodiment of the rapidly deploying transportable power system of FIG. 9, showing the solar panel frame supported by the rail system after the solar panel frame has been lowered onto the rail system.

FIG. 9 is a perspective view of an embodiment of a rapidly deploying transportable power system 300 using a gantry system (also referred to herein as a gantry crane system) for removal and deployment of the solar panel frames. FIG. 9 shows all of the solar panel frames 304 positioned within the transport enclosure 302 and shows a first gantry system 350 and a second gantry system 350 coupled with the uppermost solar panel frame 304a. FIG. 10 is a perspective view of the embodiment of the rapidly deploying transportable power system 300 of FIG. 9, showing the gantry system 350 lifting the uppermost solar panel frame 304a in a vertical direction away from the other solar panel frames 304. FIG. 11 is a perspective view of the embodiment of the rapidly deploying transportable power system of FIG. 9, showing the gantry system moving the uppermost solar panel frame out of the transport enclosure toward the rail system 306. FIG. 12 is a perspective view of the embodiment of the rapidly deploying transportable power system 300 of FIG. 9, showing the uppermost solar panel frame 304a supported by the rail system after the solar panel frame has been lowered onto the rail system.

The rapidly deploying transportable power system 300 can be configured to support any desired number of solar panel frames. With reference to FIGS. 9-12, the rapidly deploying transportable power system 300 can support 13 solar panel frames therein. Without limitation, the rapidly deploying transportable power system 300 can configured to support from approximately 10 or less to approximate 16 or more solar panel frames 304, or from approximately 11 to approximately 15 solar panel frames 304.

Any of the embodiments of the rapidly deploying transportable power system disclosed herein, including without limitation rapidly deploying transportable power system 300, can have any of the features, components, and/or other details of the rapidly deploying transportable power system 100 embodiments or the rapidly deploying transportable power system 200 embodiments, in combination with any of the features, components, or other details of the newly disclosed rapidly deploying transportable power system embodiments. Therefore, it is to be understood that this disclosure contemplates any combination of the features, components, and/or other details of any of the rapidly deploying transportable power system embodiments disclosed herein.

With reference to FIGS. 9-12, any embodiment of the gantry systems can have a hook that can removably couple with a wire or cable on each end of the solar panel so that one or a plurality of hoists or gantry cranes (such as a pair of gantry cranes, as shown in the figures) can lift the solar panels out of the transport enclosure and onto the frame assembly. The cable or wire can be removably coupleable with the solar panel frame and/or can be removably coupleable with the gantry crane assembly. The gantry crane systems or assemblies can be mechanically operated, such that the gantry crane can be rotated to move the solar panel frames to the desired position, and can be cranked to lift the solar panel frame in the vertical direction.

In any embodiments, each gantry crane system can have a hook or coupling member 352 slidable or movable along a length of a gantry support rail 354. The gantry support rail 354 can be adjustable in length to accommodate different size solar panel frames, and different sized transport enclosure or transport enclosures. The coupling member 352 can be configured to slide, roll, or otherwise move along the gantry support rail 354 to move the solar panel frame 304 from within the transport enclosure onto the rail system 306, and vice versa. In any embodiments, the coupling member 352 can have a swivel therein or otherwise be configured to rotate about a horizontal axis (that is parallel with the ground surface, such as axis A4 in FIG. 9).

The gantry support rail 354 can be supported near a center portion of the gantry support rail 354 by a vertical support arm 358. The gantry support rail 354 can extend from a first end portion 354a to a second end portion 354b such that the coupling member can move from the first end portion 354a of the gantry rail (which extends to or past a centerline of the solar panel frame) to the second end portion 354b of the gantry rail (which extends outside of the transport enclosure to a distance sufficient to permit the solar panel frame 304 to clear an outside edge of the transport enclosure). Additionally, the vertical support member 358 can be coupled with a support bracket 360 that can be used to couple the vertical support arm 358 with a vertical member 310 of the transport enclosure 302. In other embodiments, the support member 358 can be coupled directly with the transport enclosure 302.

In any embodiments, the gantry crane system 350 can have a lifting system or mechanism configured to raise and lower either the entire gantry support rail 354 as needed to lift and lower the solar panel frames 304. For example and without limitation, the gantry crane system 350 can have a crank system or other adjustability mechanism to permit the distal end portion 354a of the gantry support rail 354 to be raised and lowered either manually or automatically. Alternatively, a motor driven gear system can be used to rotate the gantry support rail 354 to raise and lower the distal end portion 354a of the arm support 354. A motor driven gear system can be used to raise and lower the gantry support rail 354.

Alternatively, the lifting system or mechanism can be configured to raise the vertical support arm 358 relative to the bracket member 360 so as to also raise the entire arm support 354 and the vertical support arm 358, including the distal end portion 354a of the support arm 354 and, hence, the coupling member 352 and one or more solar panels 304, including an uppermost solar panel 304a. The lifting system or mechanism can comprise any combination of hydraulic components, mechanical arm and crank components, gear systems, and motor systems to manually and/or automatically raise and lower the gantry support rail 354 or just the coupling member 352.

A strap or cable member 370 can be removably attachable to the solar panel frames 304 and be coupleable with the hook or coupling member 352. In this configuration, by lifting the coupling member 352, the lifting force resulting from lifting the coupling member 354 can be exerted on the solar panel frames 304.

As mentioned, the coupling member 302 of the gantry crane system 350 can slide, roll, or otherwise move along the gantry support rail 354 position of the coupling member 352 and, hence, the solar panel frame 304, relative to the transport enclosure 302. For example, with reference to FIG. 11, after vertically lifting the uppermost solar panel frame 304a with the gantry crane systems 350 so as to clear the highest vertical point or surface of the transport enclosure 302, the gantry crane systems 350 can also be used to move the uppermost solar panel frame 304a from within the transport enclosure 302 to a position outside of the transport enclosure 302.

The gantry crane system can comprise any combination of hydraulic components, mechanical arm and crank components, screw drives, linear bearings, gear systems, and motor systems to manually and/or automatically lift the solar panel frames and move the solar panel frames along the arm support 354. As shown in FIG. 12, when the solar panel frame 304 has clear the transport enclosure and is positioned in the desired position above the rail system 306, the solar panel frame 306 can be lowered onto the rail system 306. Thereafter, the cable member 370 or cable members 370 can be removed from the solar panel frame, and the solar panel frame can be moved along the rail system to the desired location.

Thereafter, the coupling members 352 of the gantry crane systems 350 can be moved to the desired position above the next uppermost solar panel frame 304a, and the cable members 370 can be attached to the next uppermost 304a solar panel frame. The cable members 370 can have quick release or even hooked shaped connectors or members that can quickly engage with openings, fasteners, or other features of the solar panel frames 304. In any embodiments disclosed herein, the gantry crane system 350 can be configured to lift and/or move two or more solar panel frame simultaneously and transport the two or more solar panel frames 304 from the transport enclosure 302 to the rail system 306.

Wind turbines can be supported by the gantry crane components. For example and without limitation, the gantry crane components can be used to support one or more wind turbines that can be supported in a horizontal and/or vertical orientation.

Additionally, in any of the embodiments disclosed herein, the rapidly deploying transportable power system can be configured such that, once the solar panel frames are deployed or positioned at the desired positions along the length of the rail system, the orientation of the solar panel frames can be adjusted automatically so that the solar panels can provide a more efficient and effective angulation relative to the sun to improve the overall efficiency of the solar panel system.

For example, the solar panel system can be configured such that the solar panels can rotate about an axis that is perpendicular to the ground surface, as indicated by Arrow A1. Rotation of the solar panel about an axis that is perpendicular to the ground is referred to rotational adjustability. This can be achieved by supporting the solar panels on one or more wires, pulleys, rollers, slides, or carriages that translate or move along the arcuate track and a motor, cable system, screw drive, or other components or assemblies adaptable to rotate the solar panel once it is supported on the arcuate track.

Figure 13:
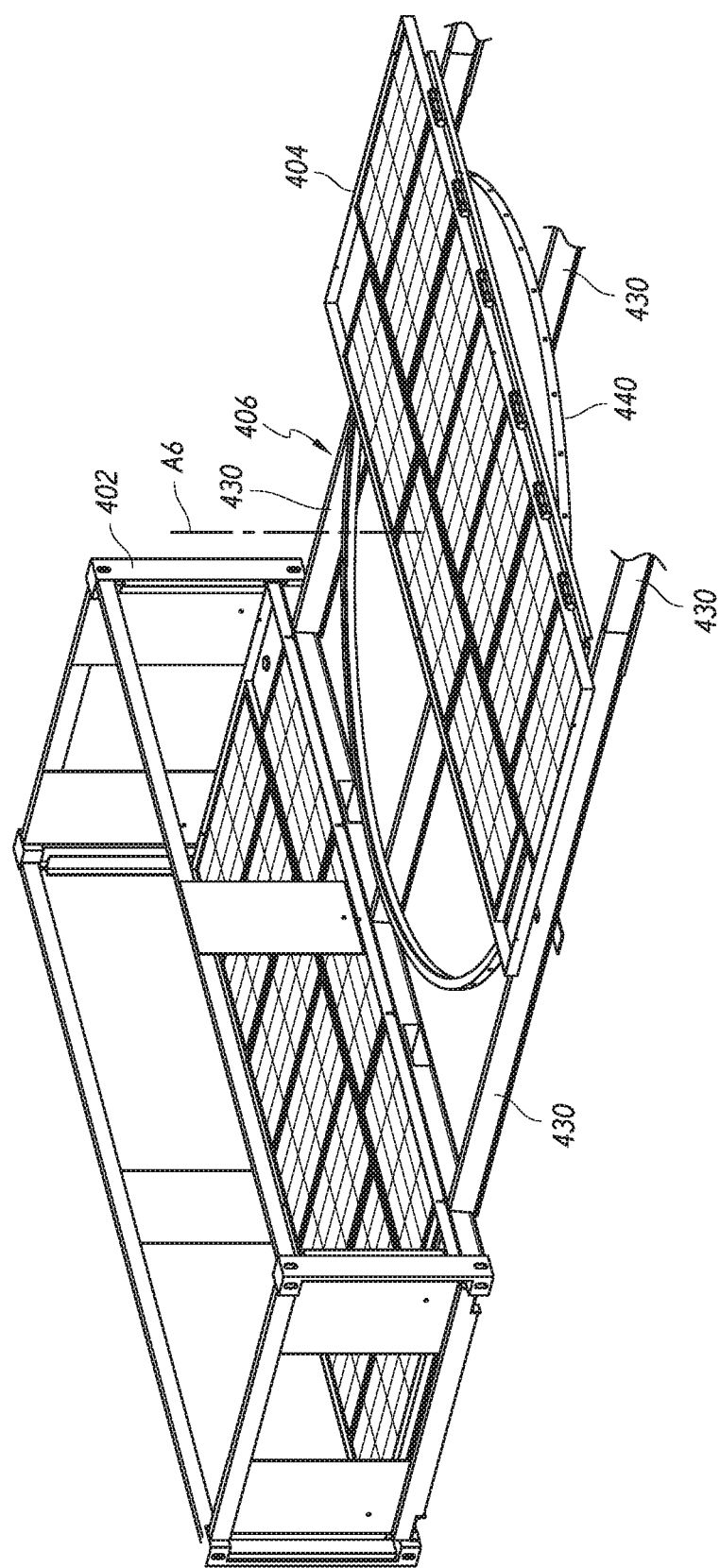
FIG. 13 is a perspective view of another embodiment a rail system that can be used with any rapidly deploying transportable power system embodiments disclosed herein, showing a solar panel frame supported in a horizontal position by the rail system.
Figure 14:
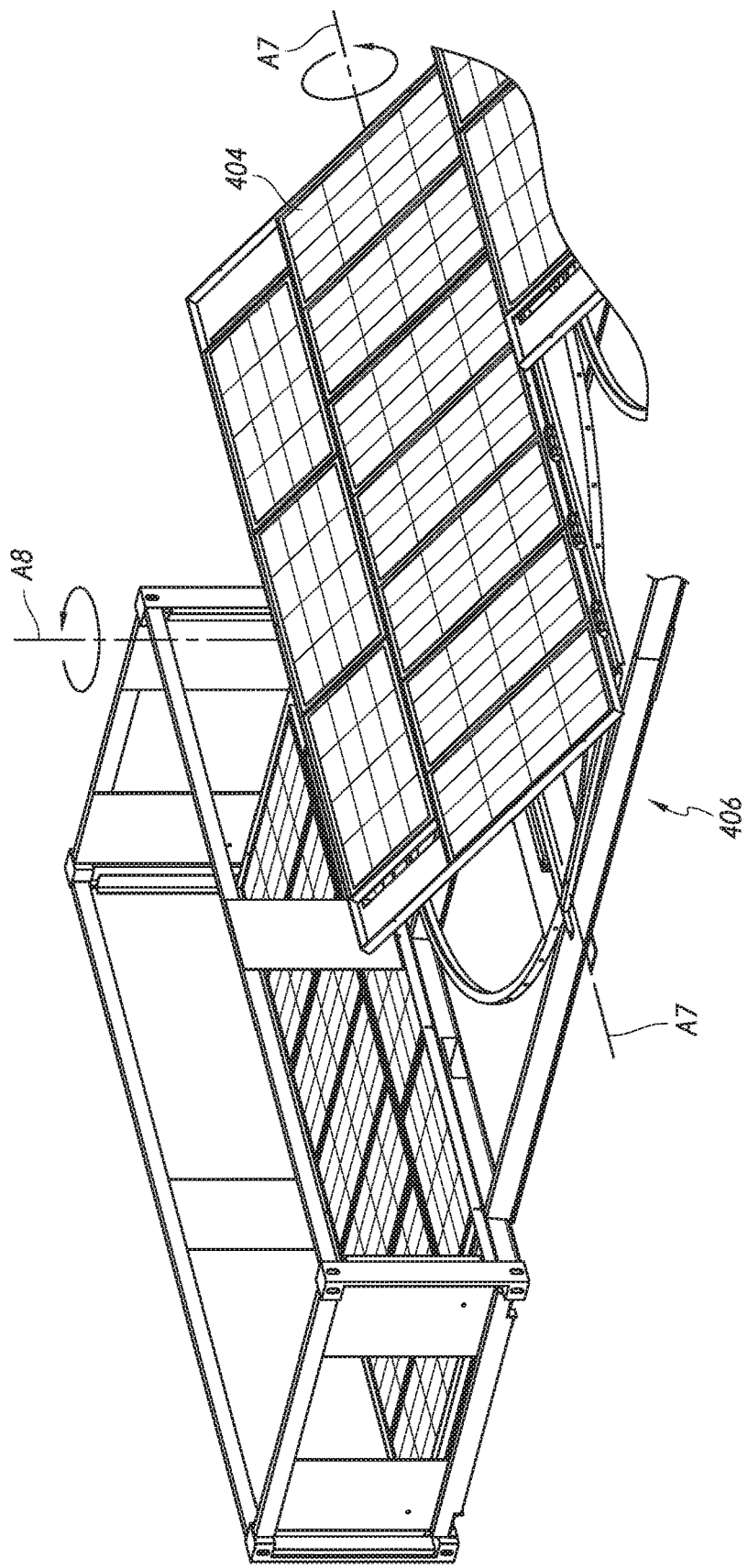
FIG. 14 is a perspective view of the embodiment of the rail system shown in FIG. 13, showing the solar panel frame supported in a tilted position by the rail system.
Figure 15:
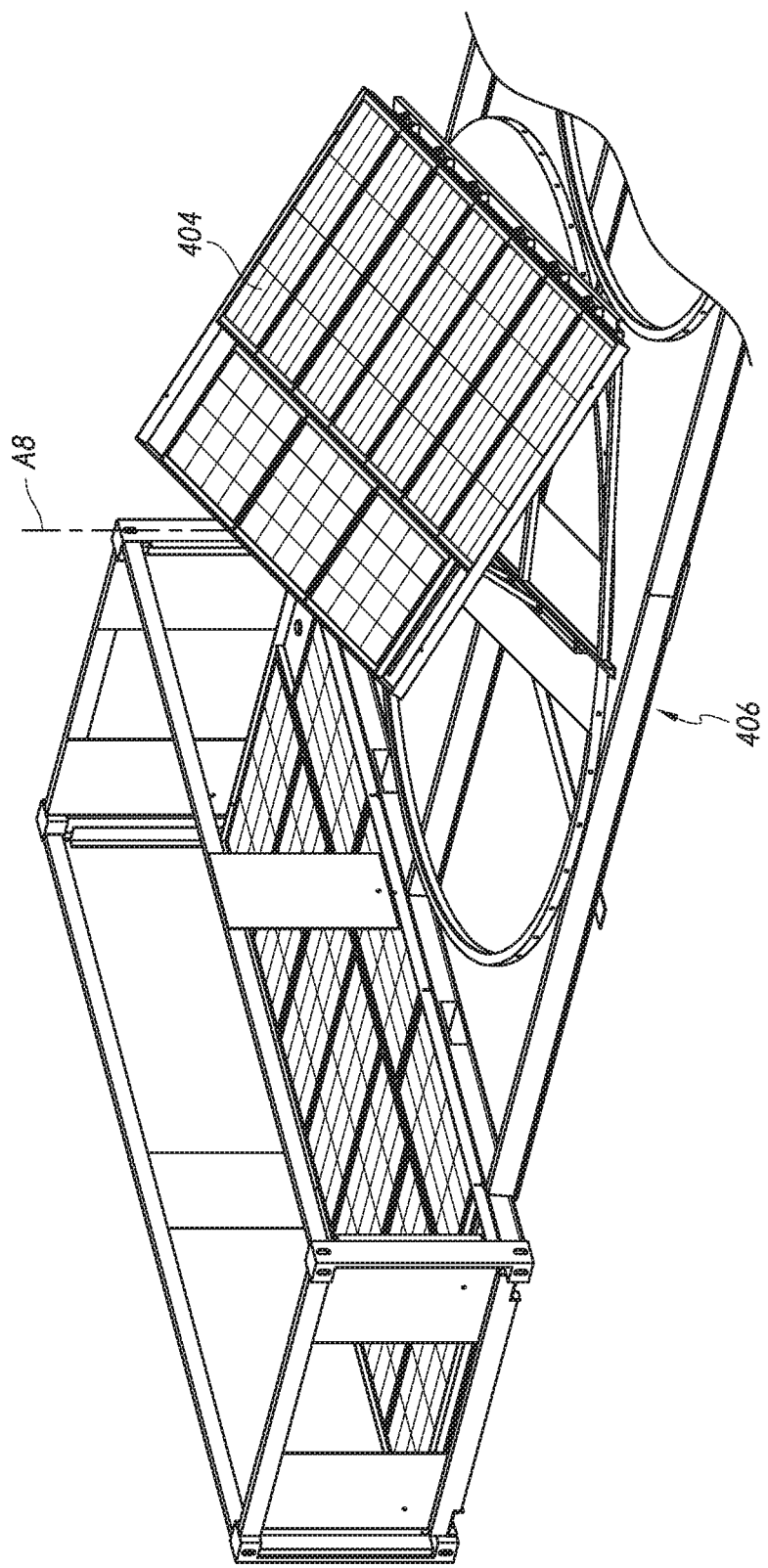
FIG. 15 is a perspective view of the embodiment of the rail system shown in FIG. 13, showing the embodiment of the solar panel frame supported in a tilted and rotated position by the rail system.

FIG. 13 is a perspective view of another embodiment a rail system 406 that can be used with any rapidly deploying transportable power system embodiments disclosed herein, showing a solar panel frame 404 supported in a horizontal position by the rail system 406. FIG. 14 is a perspective view of the embodiment of the rail system 406 shown in FIG. 13, showing the solar panel frame 404 supported in a tilted position by the rail system 406. FIG. 15 is a perspective view of the embodiment of the rail system 406 shown in FIG. 13, showing the solar panel frame 404 supported in a tilted and rotated position by the rail system 406.

The rail system 406, as illustrated, is attachable to a transport enclosure 402. However, the rail system 406 can be attached to any of the transport enclosure embodiments disclosed herein and can be used with any of the rapidly deploying transportable power system embodiments disclosed herein and in any of the components, features, and details thereof.

With reference to FIGS. 13-15, any of the rapidly deploying transportable power system embodiments disclosed herein can be configured such that any of the solar panel frames supported by the rail system can rotate about an axis that is parallel to the ground surface, as indicated by arrow A7 in FIG. 14. Rotation of the solar panel frame about an axis that is parallel to the ground is referred to herein as angular adjustability or tilt. For example and without limitation, each solar panel can have a tilt mechanism or element configured to tilt the solar panel about an axis that is parallel with the ground surface. In any embodiments, the tilt mechanism or element can comprise a screw drive configured to lift a portion of the solar panel about the bottom edge of the solar panel.

Any embodiment of the solar panel system disclosed herein can also or alternatively be configured such that any of the solar panels can individually rotate about an axis that is perpendicular to the ground surface, as indicated by arrow A8 in FIG. 14. For example without limitation, the solar panel frame members 404 (which are also referred to herein as solar panel frames) can be supported on shafts that are vertically oriented and which extend away from a ground surface. Hydraulics, screw drives, or other actuators can be used to rotate the solar panel frames to the desired rotational orientation.

Additionally, in any embodiments disclosed herein, the rail members 430 of the rail structure 406 can support circular or arcuate shaped rail members 440 (also referred to herein as the curved rail members). The curved rail members 440 can be configured to directly or indirectly support the solar panel frame members 404, and/or other structural members coupled with the solar panel frame members 404. For example, in some embodiments, sliders, rollers, or wheels can be used to support the solar panel frame members 404 by the curved rail members 440, or be used to rotate the frame members 404 by driving or rotating the rollers or wheels coupled with the frame members along the curved rail members 440.

Additionally, in any embodiments disclosed herein, cable and pulley systems can be used to interconnect two or more of the frame members 404 in the solar panel array or the components used to rotate the solar panels in the array so as to simultaneously and uniformly rotate the two or more solar panel frames 404. For example, if a shaft positioned at the center of the curved rail member 440 is used to rotate the solar panel frames, cables can be interconnected from one shaft to the shaft of the adjacent frame member to simultaneously rotate the adjacent solar panel frames. Cable and pulley components can also be directly or indirectly coupled with the solar panel frame members to simultaneously rotate two or more of the array to track the sun.

Any embodiments disclosed herein can have a GPS system or features for sun location and tracking for purposes of adjusting an angular and a rotational position of the solar panels. The location of the sun can be determined by using a GPS location receiver inputting data to a micro-computer controller with internal daily/seasonal sun positioning data which output movement control circuitry to the angular and rotational adjustment mechanisms.

In any embodiments disclosed herein, the rapidly deploying transportable power systems can be configured such that the solar array configuration can be adjusted to a fixed sun position angle or automated to move or adjust in a single axis or dual axis manner for maximum energy harvesting generation.

Figure 16:
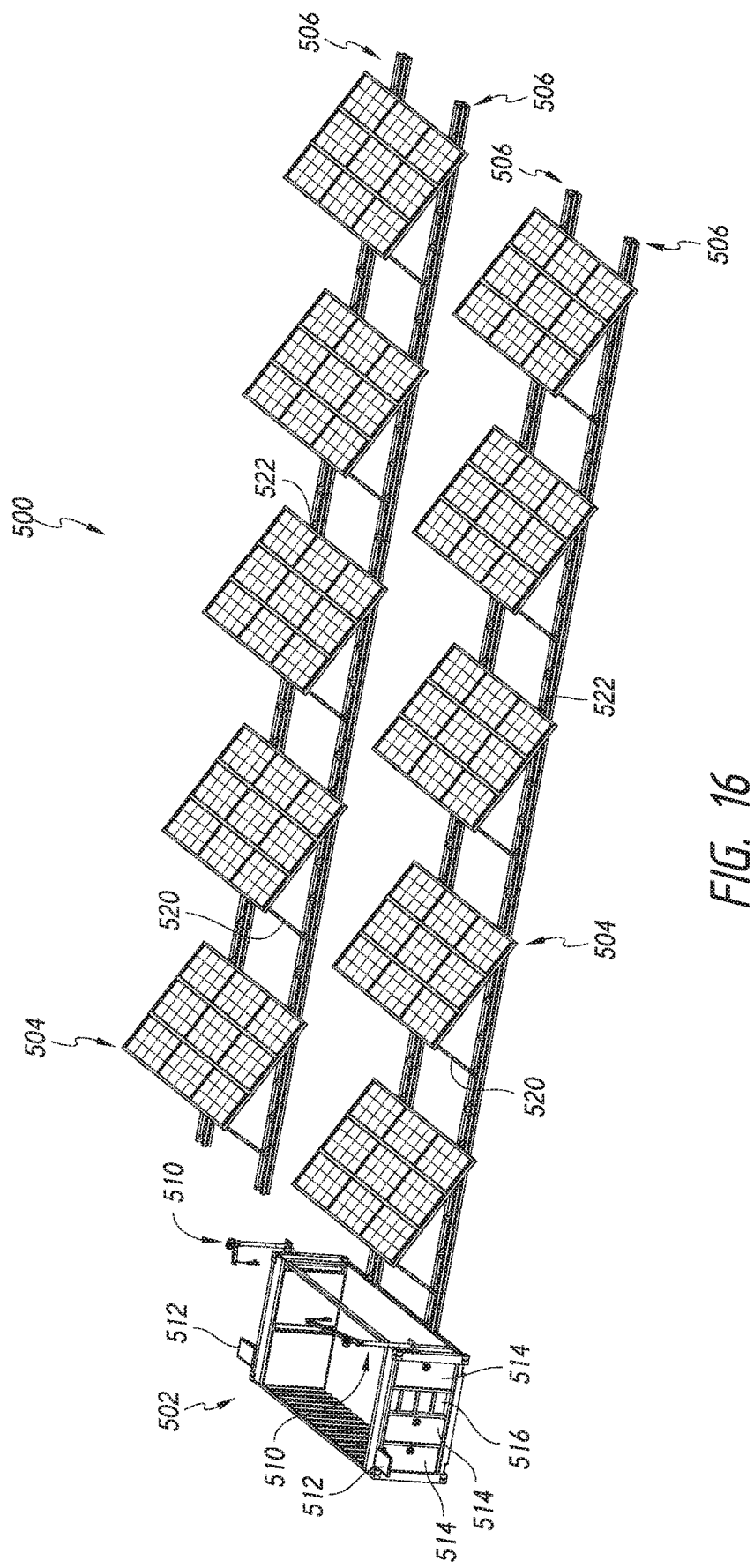
FIG. 16 is a perspective view of another embodiment of a rapidly deploying transportable power system, showing the embodiment of the power system in a deployed or second state.

FIG. 16 is a perspective view of another embodiment of a rapidly deploying transportable power system 500, showing the embodiment of the power system in a deployed or second state. The deployed state, the solar panel frames 504, track assemblies 506, and other components have been removed from the transport enclosure 502 and set up in an operational state. In any embodiments disclosed herein, any of the electronic or control system components, such as controllers, optimizers, inverters, batteries, or other electronic components can be housed within the transport enclosure 502 even in the operational state. For example, in any embodiments, the solar panel frames 504 can be sized and positioned so that a dedicated space within the transport enclosure can house or support such electronics and/or battery and other control system components. In any embodiments disclosed herein the transport enclosure can be approximately 20 feet long, approximately 8 feet wide, and approximately 57 inches tall. In this size enclosure, 13 solar power frames can be supported within the enclosure (without the tracks being inside the enclosure), and the solar power system can produce 24 kilowatts of energy or more from the 13 solar power frames. The energy production capability from each solar panel of each solar panel frame is between approximately 200 watts and approximately 300 watts. Two stacked enclosures of this size, when deployed, can produce approximately 50 kilowatts of energy.

Additionally, any of the solar power system embodiments disclosed herein can have two or more transport enclosures. During shipment, the transport enclosures can be stacked one on top of the other. The transport enclosures can be coupled or selectively fastened together during transportation.

Any of the embodiments of the rapidly deploying transportable power systems disclosed herein, including without limitation rapidly deploying transportable power system 500, can have any of the features, components, measurements, materials, and/or any other details of any of the other rapidly deploying transportable power systems disclosed herein, including without limitation rapidly deploying transportable power system embodiments 100, 200, 300, 400, or otherwise, in combination with any of the features, components, or other details of the newly disclosed rapidly deploying transportable power system embodiments. Therefore, it is to be understood that this disclosure contemplates any combination of the features, components, and/or other details of any of the rapidly deploying transportable power system embodiments disclosed herein. Additionally, any of the deployment or assembly steps, or other method or process steps or sequences disclosed herein with respect to any of the embodiments should be understood to apply to all of the embodiments disclosed herein, as appropriate.

Figure 17:
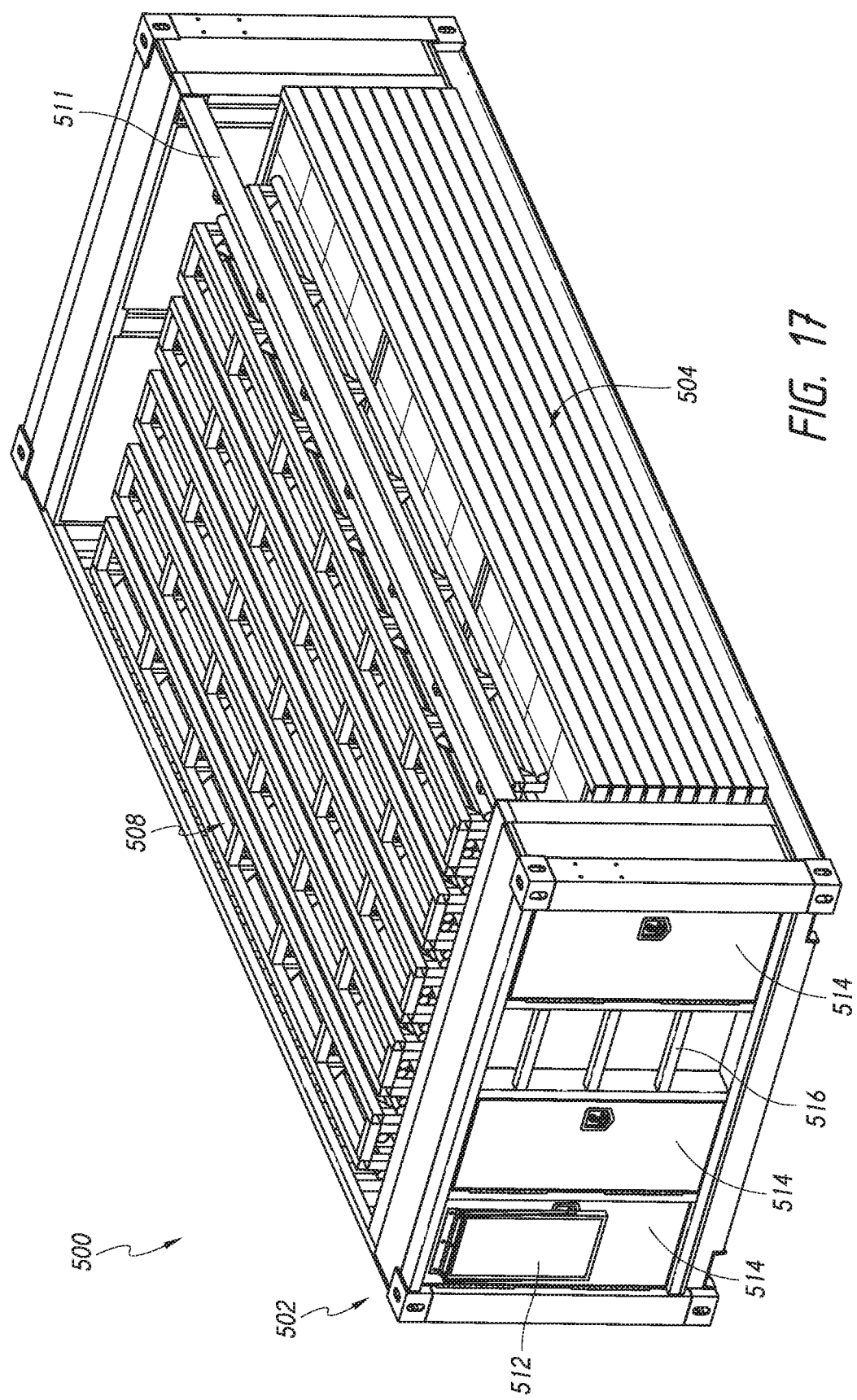
FIG. 17 is a perspective view of the embodiment of the rapidly deploying transportable power system shown in FIG. 16, showing the embodiment of the power system in a stowed or first state.

FIG. 17 is a perspective view of the embodiment of the rapidly deploying transportable power system 500 shown in FIG. 16, showing the embodiment of the power system 500 in a stowed or first state. In the stowed state, all of the solar panel frames 504 are supported by the transport enclosure 502, within the interior space of the transport enclosure. In some embodiments, the solar panel frames 504 can be wider than the interior space of the transport enclosure such that a portion of one or more of the frame 504 extends out of the interior space of the transport enclosure 502. For example, in the illustrated embodiment, the frames 504 can extend out past an outer surface of the transport enclosure 502 by approximately 2.75 inches. However, in any other embodiments, the frames can be sized such that the frames 504 fit completely within the interior space of the transport enclosure 502.

In any embodiments disclosed herein, a cover can be positioned over a top opening and/or a side opening of the transport enclosure to cover an interior space of the transport enclosure and/or protect the transportable power system 500 from moisture, dirt, sunlight, and other elements and/or contaminants. Additionally, in any embodiments, a cover can be positioned over a front side of the transport enclosure to protect the transportable power system 500 from moisture, dirt, sunlight, and other elements and/or contaminants. The cover for the top and/or side can be, without limitation, soft, flexible, or rigid. The rigid cover can be made from any suitable rigid materials such as metal, plastic, glass filled materials such as fiberglass, composite materials, and/or any other suitable materials or combinations thereof. The soft cover can be made from any suitable material or materials, including reinforced or unreinforced vinyl, polyethylene, or any other suitable plastic materials. The cover can be UV treated to protect against degradation from UV radiation.

Additionally, any solar system embodiments disclosed herein can have locking or securing features to lock the contents of the transport enclosure to prevent theft, loss, and/or excess movement of the contents of the transport enclosure. This can include, without limitation, the solar panel frames, electronics, batteries, deployment devices, track assemblies, and/or any other components supported within the transport enclosure. The locking and/or securing mechanisms can include brackets (locking or otherwise), cables, clamps, padlocks, and/or any other suitable components.

Additionally, as shown in FIG. 17, all of the track assemblies 508 can be positioned within the transport enclosure 502. In the illustrated embodiment, the track assemblies 508 are assembled together in a nested configuration (some of the track assemblies being inverted or oriented oppositely as compared to others) so as to minimize the space requirements, or maximize the space efficiency, of the track assemblies 508. The plurality of the track assemblies 508 can be positioned above the solar panel frames 504 within the transport enclosure 502. In any embodiments disclosed herein, the track assemblies 508 can be held together using high strength straps, which can include, but are not required to include, ratchet mechanisms for tightening of the straps. Additionally, each of the solar panel frames 508 can have a strap affixed to or coupled there with which can be used for lifting the solar panel frames 508 into an out of the transport enclosure 502. To assist in a rapid deployment, the straps used to move each of the solar panel frames 508 into the transport enclosure can remain attached to each of the solar panel frames 508 so that a hook portion of the cranes can easily couple with the straps and, therefore with the solar panel frames 508.

Additionally, as shown in FIG. 17, any embodiment of the transport enclosure can have multiple doors 514 (three being shown), a ladder 516 to access the top of the enclosure, and even solar panels 512 positioned on either or both of the end portions of the transport enclosure 502. The solar panels 512 can be used to charge batteries, including without limitation, the batteries supported within the transport enclosure that provide power to the crane or gantry assemblies. In any embodiments disclosed herein, the transport enclosure can support two doors on either or both of the sides of the transport enclosure. The doors can be sized to extend approximately halfway across the side of the transport enclosure.

Figure 18:
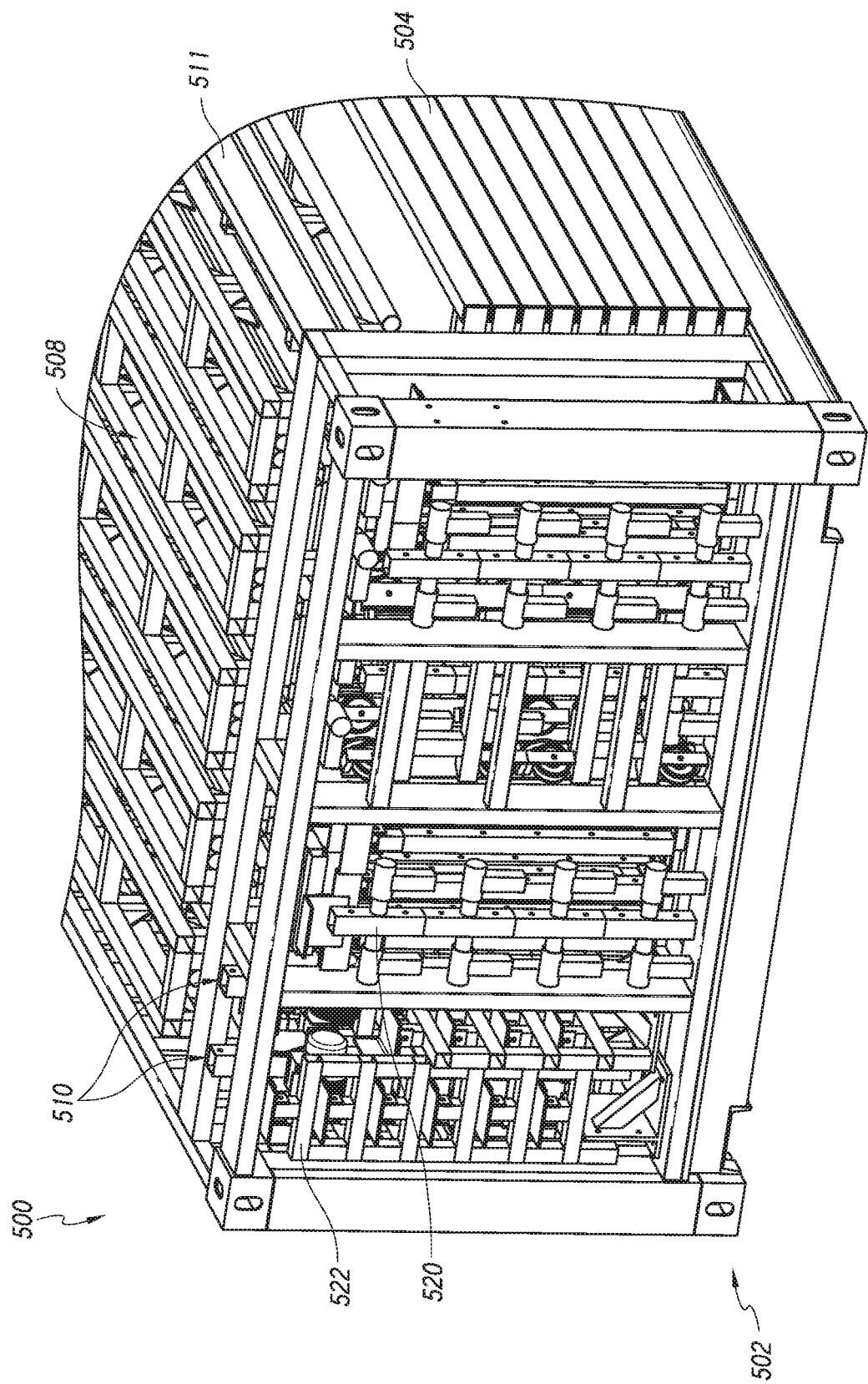
FIG. 18 is a perspective view of an end portion of an embodiment of the transport enclosure of the transportable power system shown in FIG. 17, with some components of the embodiment of the transport enclosure removed from view.

FIG. 18 is a perspective view of an end portion of an embodiment of the transport enclosure 502 of the transportable power system 500 shown in FIG. 17, with some components of the transport enclosure 502 removed from view so that the components stored within the transport enclosure 502 can be seen. For example without limitation, with reference to FIG. 18, the embodiments of the top and bottom bracket assemblies 520, 522, the lift systems 510 (which can comprise crane and/or gantry components), and other components and structures can be supported within the transport enclosure 502 near or adjacent to an end portion of the transport enclosure 502. In some embodiments, to be able to remove the solar panel frames 504 from the transport enclosure 502, support member 511 can be removed from the transport enclosure and set aside. The support member 511 can be formed from approximately 2 inch by approximately 6 inch steel tubing. Bolts, screws, pins, clamps, or other fasteners or components can be used to couple the support member 511 with the transport enclosure.

In any embodiments disclosed herein, each frame can be supported by a first bottom bracket and a first top bracket positioned at a first side of the frame and coupled with a first track system, and a second bottom bracket and a second top bracket positioned at a second side of the frame and coupled with a second track system. The top and bottom brackets disclosed herein need not be coupled with, or support, the frames at the top and bottom of the frames. The top and bottom brackets can be coupled with the frame at any desired location or position on the frame. In any other embodiments, the frames can be supported by one, three, or more top and/or bottom brackets, and/or one, three, or more track systems.

As discussed, the rapidly deploying transportable power system 500 can be configured to support any desired number of solar panel frames 504. For example and without limitation, the rapidly deploying transportable power system 500 can configured to support from approximately 8 or less to approximate 14 or more solar panel frames 504, or from approximately 10 to approximately 12 solar panel frames 504. In the illustrated embodiment, the transport enclosure 502 supports 10 solar panel frames 504. In any embodiments disclosed herein, the thickness of the solar panel frames can be approximately 3 inches, or from approximately 2 inches to approximately 4 inches. The frames can be made from a robust and structurally rigid material that can withstand sun and heat exposure, as well as withstand damage from other elements that the frames may be exposed to. Additionally, in some embodiments, the frames can be approximately 400 pounds, or from approximately 350 pounds to approximately 450 pounds, or from approximately 350 pounds or less to approximately 640 pounds or more. In any embodiments disclosed herein, the solar panel frames 504 can be approximately 192 inches long by 96.5 inches wide.

Additionally, any of the solar panel frame embodiments disclosed herein can be prewired to also have a length of wire supported within the frame or by the frame that can be extended away from the frame so as to connect the frame with adjacent frames or with other electrical components. For example, some embodiments of the solar panel frames can have a cavity or space formed therein for supporting a desired length of the electrical wiring. Quick connect and disconnect connectors can be used at any location where electrical connections are needed to permit the rapid connection and disconnection of the electrical components.

In the deployed state of this embodiment, there can be 10 or more solar panel frames 504 positioned along the track assembly series 506 (also referred to herein as a track system). Each track assembly series 506 can comprise multiple individual track assemblies 508 (also referred to herein as track modules). The embodiment of the power system 500 illustrated in FIG. 19 can have ten total track assemblies 508, such that each track assembly 508 is configured to support a single solar panel frame 504. In any other embodiments disclosed herein, any suitable or desired number of track assemblies 508 and solar panel frames 504 can be included in the system, which can depend on the customer's needs and/or the size of the transport enclosure.

Each track assembly 508 can have any desired or suitable length. For example and without limitation, in the illustrated embodiment, each track assembly 508 can be approximately 164 inches long, such that the series of five track assemblies 508 of embodiment 500 can be approximately 820 inches long (making the track assembly series 506 approximately 820 inches long). In the illustrated embodiment, the track assemblies 508 have been arranged into two separate series, each series being approximately 820 inches long. However, the track assemblies 508 can be deployed in any desired arrangement, including one long series being (which, for this embodiment, would be approximately 1,640 inches long), or in three or more different series. Additionally, each of the series can be the same length or even a different length, again, depending on the condition of the ground, the size and shape of the space available, and/or the desires of the end-user. If more than one series 506 of track assemblies 508 is used, the deployment operator or installer may move the transport enclosure to a but against the first end of the track assembly series 506 and position the transport enclosure so as to be approximately centered with the track assembly series 506 such that the solar panel frames can be removed and placed directly onto the track assembly series 506, as is shown in FIG. 16. After deploying the solar panel frames onto one of the track assembly series 506, if more than one track assembly series 506 has been deployed, the user can simply move the transport enclosure to the appropriate position adjacent to the second or third or other track assembly series 506.

In any embodiments disclosed herein, the length of the track assemblies can be configured to provide an optimal spacing between the solar panel frames to optimize the exposure to the sun of each solar panel frame. For example, the solar panel frames can be spaced apart such that, when deployed an angled, the solar panel frames do not shade any of the adjacent solar panel frames or provide for minimal shading of adjacent solar panel frames. For example and without limitation, when the solar panel frames are supported in a flat state or orientation on the track assemblies, the track assemblies can be configured and the solar panel frames can be arranged to have approximately 67 to approximately 68 inches between adjacent solar panel frames. In other embodiments, the track assemblies can be configured and the solar panel frames can be arranged to have between approximately 50 inches and approximately 80 inches or more between the solar panel frames. The spacing will also depend on the height of the solar panel frames. Taller solar panel frames may require more spacing between adjacent solar panel frames to prevent or minimize shading.

With reference to FIG. 16, once all the solar panel frames 504 have been deployed onto the track assembly series 506 using cart devices 530 (also referred to herein as carts or load carrying devices), as will be described in greater detail below, the first or bottom bracket assemblies 522 and the second or top bracket assemblies 520 can then be coupled with the track assemblies 508 as each of the solar panel frames 504 is moved into the desired position along the track assemblies 508. The assembly or coupling of the top and bottom bracket assemblies 520, 522 to the track assemblies 508 will be described in greater detail below. After each solar panel frame 504 is moved into the desired position, each solar panel frame 504 can thereafter be coupled with the top and bottom bracket assemblies 520, 522. Bolts, pins, or other fasteners or suitable hardware can be used two more securely fasten the solar panel frames 504 to the top and bottom bracket assemblies 520, 522, and two more securely fasten the top and bottom bracket assemblies 520, 522 to the track assemblies 508.

Figure 19:
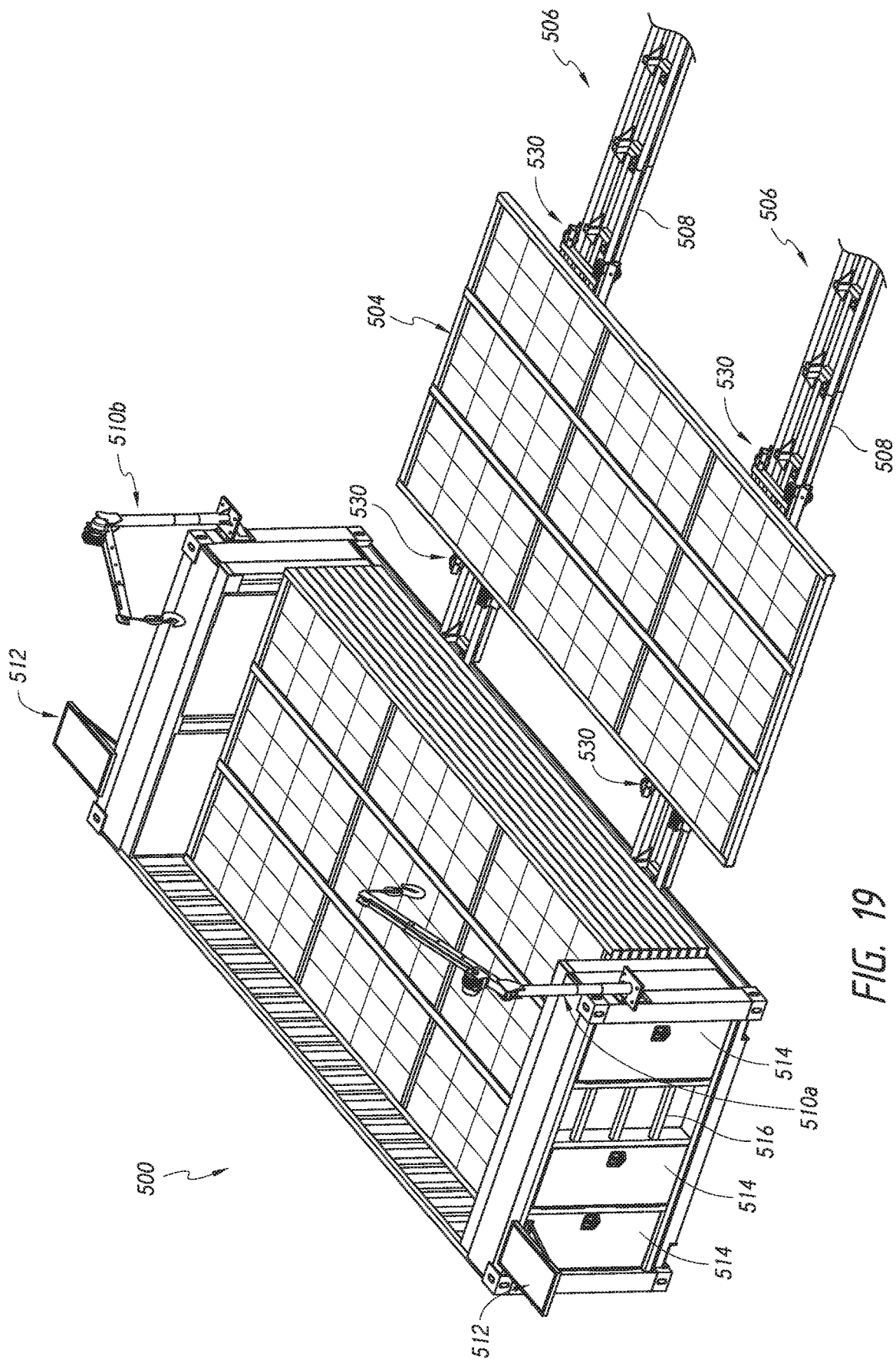
FIG. 19 is a perspective view of a portion of the embodiment of the rapidly deploying transportable power system shown in FIG. 16, showing the power system in a partially deployed state.

In any embodiments disclosed herein, the solar panel frames 504 can each be coupled with the top and bottom bracket assemblies 520, 522 each time a solar panel frame 504 is loaded onto the track assemblies 508. For example, close and are the installers can roll the solar panel frames 504 to the desired position using the cart devices 530 (for example, with one load carrying device under each of the four corners of the solar panel frame 504, as shown in FIG. 19). In any embodiments disclosed herein, the solar panel frames 504 and/or the cart devices 530 can be configured to allow the user or installer to selectively fasten or secure the frames 504 to the cart devices 530, such as by using clamps, hinges, pins, or other fasteners or components. Once in the desired position, the installers can lift the solar panel frames 504 off of the cart devices 530 and onto the mating surface of the top and bottom bracket assemblies 520, 522. Thereafter, cart devices 530 can be removed or manually rolled back along the track assemblies 508 to the start of the track assembly series 506, and the position of the top and bottom bracket assemblies 520, 522 can be adjusted such that the solar panel frames 504 receive optimal sun exposure. Both the top and bottom bracket assemblies 520, 522 can be rotatable so that the solar panel frames 504 can rotates about the bottom bracket assemblies 522. As will be described in greater detail below, a length of the top bracket assemblies 520 can be telescopically adjusted so as to hold the top portion of the solar panel frames 504 in the desired angular position. Pins, screws, detents, or other fasteners or suitable components can be used to hold or support the top bracket assemblies 520 in the desired position. In any embodiments, the cart devices can have wheels, bearings, and/or non-wheeled sliders to translate along the track assemblies.

FIG. 19 is a perspective view of a portion of the embodiment of the rapidly deploying transportable power system 500 shown in FIG. 16, showing the power system 500 in a partially deployed state. With reference to FIG. 19, a first lift system 510*a* and a second lift system 510*b* (both of which can comprise a wench, cable, support arm or boom, and other crane type components) have been attached to or coupled with a corner structural support member of the transport enclosure 502. This can be achieved using quick attachment brackets, bolts, locking pins, or any other suitable fasteners or components. Each of the crane systems 510 can have electrically powered motors, cables, cooks, and other structural components configured to operate the crane systems 510. Additionally, the crane systems can be configured to rotate about a vertical axis so that, once each of the components (which can be the solar panel frames 504, or the individual or collective track assemblies 508 which can be bound together with straps) has been lifted in the vertical direction relative to the transport enclosure, the cranes can then rotate so as to translate the lifted components toward the ground or the track assemblies 508 adjacent to the transport enclosure 502. Thereafter, the component can be lowered with the crane assemblies onto the ground or onto the cart or cart devices 530 supported by the track assemblies 508. The crane assemblies 510 can be manually rotated or can have motors and/or other electrical components configured to rotate the crane assemblies as desired.

Figure 20:
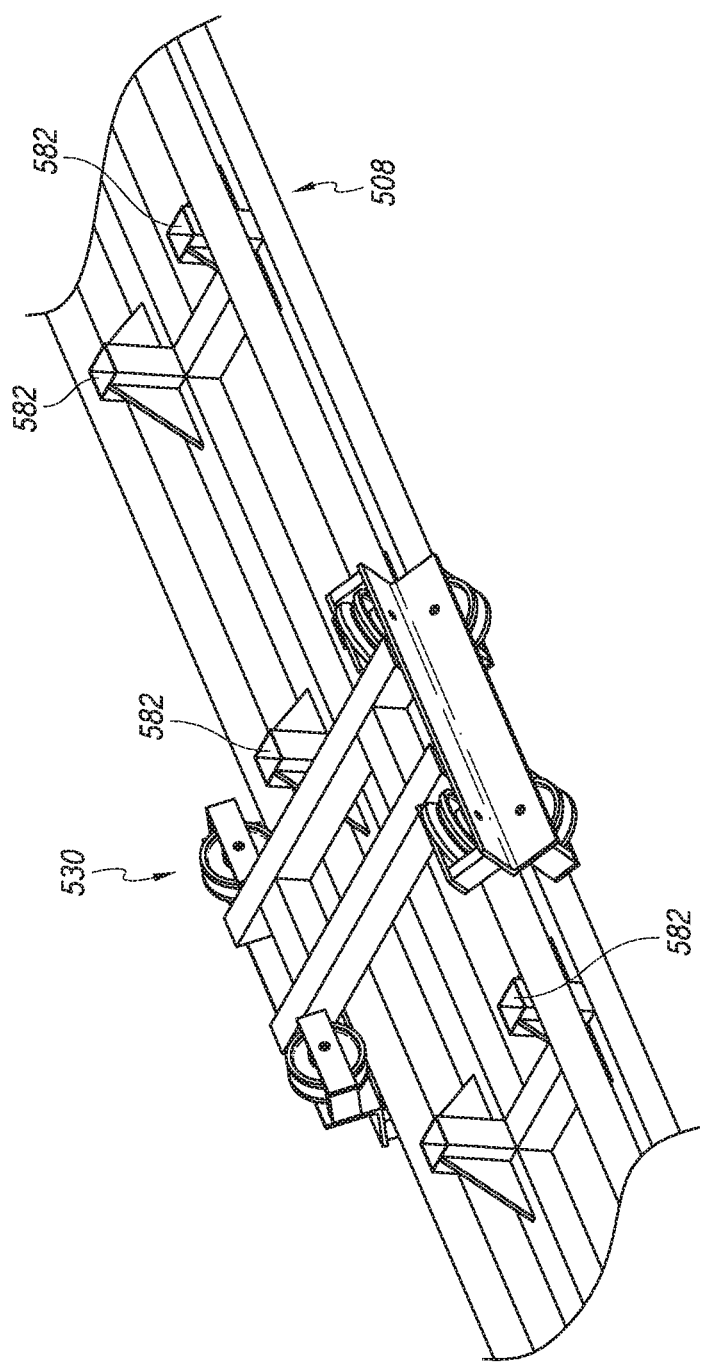
FIG. 20 is a perspective view of a portion of an embodiment of a track assembly supporting an embodiment of a load carrying device on two rails of the track assembly embodiment.

FIG. 20 is a perspective view of a portion of an embodiment of a track assembly supporting an embodiment of a cart device 530 on two rails of the track assembly embodiment 508. FIG. 21 is a perspective view of the embodiment of the track assembly 508 shown in FIG. 20. FIG. 22 is a perspective view of the embodiment of the cart 230 shown in FIG. 20. Each track assembly 508 can comprise a first and a second lengthwise support member 580. The first and second lengthwise support members 580 can be spaced apart by a plurality of lateral support members 581. In the illustrated embodiment, each of the lateral support members 581 can be approximately 8 inches long, or between approximately 5 inches long and approximately 10 inches long. Additionally, a plurality of vertical support members 582 can be positioned along a length of the longitudinal support members 580 at any desired spacing or interval. Any of the longitudinal support members 580, the lateral support members 581, and the vertical support members 582 can be made from aluminum, steel, or other desired material and can be in the form of square tubing. These members can be approximately 2 inches wide, or approximately 1.5 inches wide, or between approximately 1 inch and approximately 3 inches wide. Paint, powder coat, or any other appropriate finish can be added to any components of the transportable power system embodiments disclosed herein to protect same from corrosion or other degradation, and/or for appearance. Gussets or support brackets 584 can be coupled with the vertical support members 582 and the longitudinal support members 580 to provide additional strength, rigidity, and support to the vertical support members 582. Additionally, in any embodiments disclosed herein, the track assemblies 508 can have one or more rail members 590 (two being shown) that run the length of the track assembly 508. In the illustrated embodiment, the rail members 590 can have a round profile, and can be made from hollow metal tubing, which can be steel, aluminum, or any other desired material. In the illustrated embodiment, the rail members 590 have an approximately 2 inch, or an approximately 1.5 inch, or between an approximately 1 inch and an approximately 3 inch, outside diameter.

All of the components of the track assembly 508 can be fastened together using any suitable components, mechanisms, or techniques, including but not limited to welding, brazing, screws or other fasteners, high-strength adhesives, or any combination of the foregoing, or otherwise. Additionally, any embodiments of the track assemblies 508 disclosed herein can have brackets coupled with end portions thereof, the brackets being configured to enable the track assembly 508 to rigidly couple with the adjacent track members 508. For example, angle brackets can be coupled with the lengthwise support member is 580, or internal brackets can be positioned within the lengthwise support members 580, so that the brackets positioned at the end portions of the adjacent track members 508 can be coupled or fastened together to prevent the relative movement of the track member 508 relative to adjacent track members 508.

With reference to FIG. 22, the cart device 530 can be sized and configured to couple with and roll along the rail members 590 of the track assembly 508. In any embodiments, the cart device 530 can have a pair of first support members 560 and a pair of second support members 561 positioned between the first support members 560. Wheel support members 562 (which can be formed from steel or other metal, and can be in the shape of angle material) can be coupled with the end portions of the first support members 560. The wheel support members 562 can support the wheels 564 that roll or translate along the rails 590 of the track assembly 508. The cart device 530 illustrated in FIG. 22 has a total of eight rollers or wheels 564, four wheels 564 being positioned on each side of the cart device 530. The two wheels 564 on each side of the cart device 530 in the uppermost position are configured to roll along an upper portion of the rail members 590. The uppermost wheel members 564 are also angled so as to provide lateral positional stability to the cart device 530 relative to the rail members 590. The lowermost wheel members 564 are configured to roll along a lower portion of the rail member 590, and are configured to prevent the cart from lifting off of the rail members 590, for example, in windy conditions or other conditions that may cause the cart devices 530 to lift away from the rail members 590. In any embodiments, the uppermost wheels on each side can be positioned at an approximately 90° angle relative to the lowermost wheels on each respective side of the cart, such that there is approximately a 90° angular difference between the axial center of rotation of the uppermost wheels relative to the axial center rotation of the lowermost wheels. In some embodiments, the uppermost wheels on each side of the cart can be positioned at any desired angle relative to the lowermost wheels.

The wheel support members 562 can have a first surface 562*a* that is generally perpendicular to an axial center of rotation of the uppermost wheels, and a second surface 562*b* that is generally perpendicular to an axial center of rotation of the lowermost wheels. In some embodiments, however, the first surface 562*a* can be at any desired angle relative to the second surface 562*b* of the wheel support members 562, including from approximately 60° to approximately 120°, or from approximately 80° to approximately 100°, or otherwise. Wheel bracket members 566 can be supported in direct or indirect contact with the wheel support members 562 and can provide further support to each of the wheel members 564. For example, a short structural member, such as hollow rectangular tubing, can be positioned between the wheel support members 562 and the wheel bracket members 566. The various components of the cart device 530, just as with any other assembled components disclosed herein, can be assembled or secured together by any suitable method, including, threaded fasteners, welding, high-strength adhesive, or otherwise. A shaft, an axle, bolts, or other suitable component can advance through the wheel support members 562, the wheel members 564, and/or the wheel bracket members 566 to support the wheel members 566 on the cart device 530. The cart devices 530 can be rolled onto the rail members 590 from an end of the track assembly series 506, or by removing and replacing one or more of the wheels 564 of the cart device 530. In other embodiments, the cart can be designed to have six total wheels, having only one lowermost wheel 564 on each side of the cart device 530.

Figure 23:
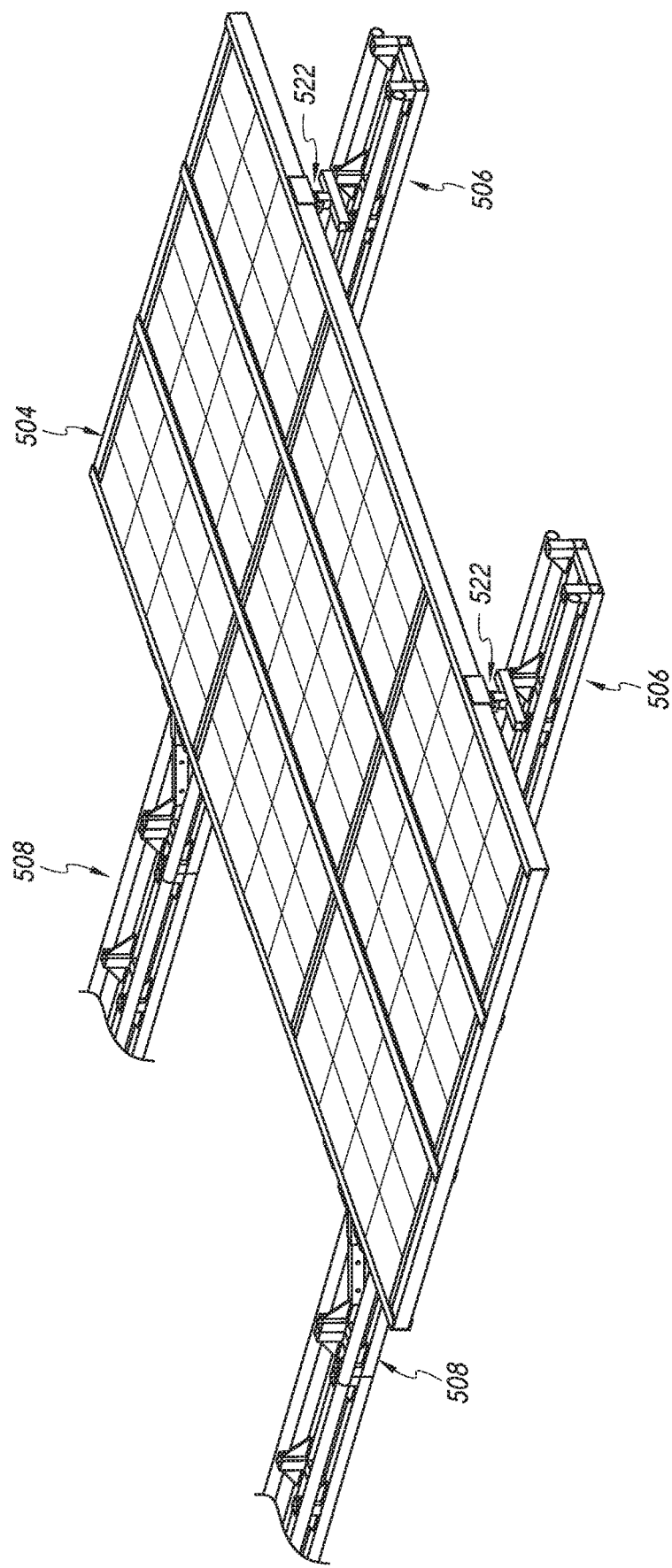
FIG. 23 is a perspective view of an end portion of the track assembly shown in FIG. 16, showing an embodiment of a solar panel frame in a partially deployed state.
Figure 24:
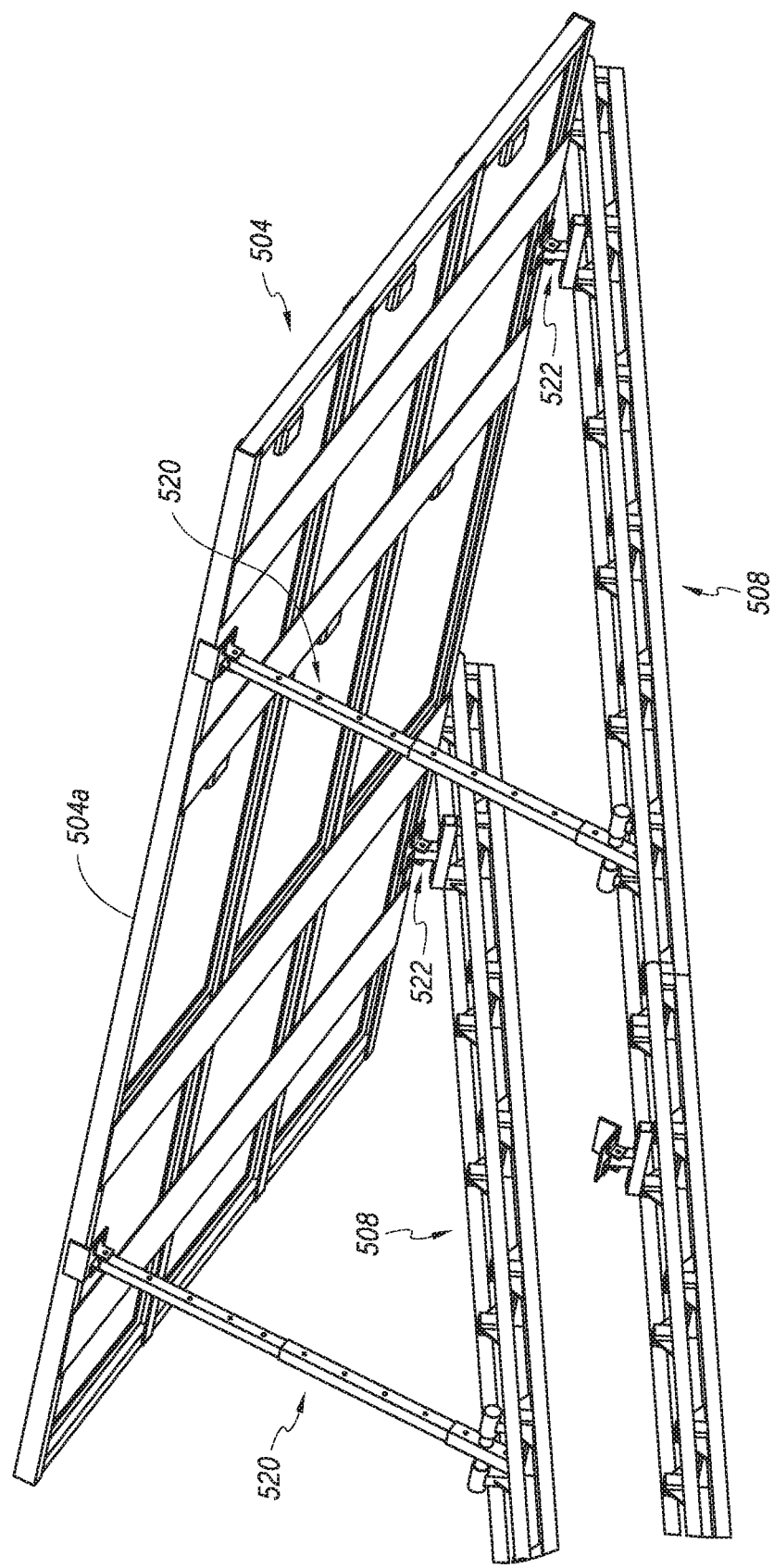
FIG. 24 is a perspective view of an end portion of the track assembly shown in FIG. 16, showing an embodiment of a solar panel frame in a deployed state.

As mentioned, to deploy the solar panel frames 504, the solar panel frames are lowered onto cart devices 530 that can be used to translate the solar panel frames 504 along the length of the track assembly series 506. Once the solar panel frame 504 is in the desired position, the solar panel frame 504 can be lifted off of the carts by the installation crew, and/or using hydraulic or pneumatic jacks or otherwise. One corner can be lifted at a time and positioned on the top and bottom bracket assemblies 520, 522. FIG. 23 shows a solar panel frame 504 positioned on the top and bottom bracket assemblies 520, 522 adjacent to an end portion of the track assembly series 506. Bolts, screws, pins, or other fasteners can be used to secure the solar panel frames 504 to the top and bottom bracket assemblies 520, 522. Thereafter, with reference to FIG. 24, the top bracket assemblies 520 can be extended so as to lift a top portion 504a of the solar panel frame so as to support the solar panel frame at an optimal angle. Bolts, screws, pins, or other fasteners or components can be used to secure the top bracket assemblies 520 in the desired position.

FIG. 25 is a perspective view of an embodiment of a first or bottom bracket assembly 522. The bottom bracket assembly 522 can have a first support member 610, one or more vertical support members 612 (two being shown), and an engagement member 616 configured to engage or couple with the solar panel frame 504. The engagement member 616 can be coupled with the first support member 610 using a support member 618 and a pair of flanges 619. The engagement member 616 can be supported by the other components of the bottom bracket assembly 522 in a manner that permits the engagement member 616 to rotate about a horizontal axis relative to the other components of the bottom bracket assembly 522. For example, in the illustrated embodiment, a pin, bolt, screw, shafts, or other fastener or component can be advanced through the opening 622 in each of the flange members 619, which can also pass through openings formed through the support member 618, so as to provide an axle about which the engagement member 616 can rotate. Holes, or other openings, can be formed in the engagement member 616 to permit fasteners to pass through the engagement member 616 and couple with the solar panel frame 504.

Additionally, the vertical support members 612 can be configured to couple with the vertical support members 582 of the track assemblies 508. In this arrangement, the bottom bracket assemblies can be quickly and easily attached to or coupled with the vertical support members 582 of the track assemblies 508 simply by inserting or advancing the vertical support members 612 of the bottom bracket assembly 522 into the inside of the vertical support members 582, thereby engaging the front bracket members 522 with the track assemblies 508 at any desired position along a length of the track assemblies 508.

FIG. 26 is a perspective view of an embodiment of a second or top bracket assembly 520. The top bracket assembly 520 can have a first support member 640, one or more vertical support members 642 (two being shown), first and second adjustable support members 652, 654, and an engagement member 660 configured to engage or couple with a top portion of the solar panel frame 504. The engagement member 660 can be coupled with the first support member 640 using a support member 618 and a pair of flanges 619. The engagement member 660 can be supported by the other components of the top bracket assembly 520 in a manner that permits the engagement member 660 to rotate about a horizontal axis relative to the other components of the top bracket assembly 520. For example, in the illustrated embodiment, a pin, bolt, screw, shafts, or other fastener or component can be advanced through the opening 662 in each of the flange members 664, which can also pass through openings formed through the second adjustable support member 654, so as to provide an axle about which the engagement member 660 can rotate. Holes or other openings can be formed in the engagement member 660 to permit fasteners to pass through the engagement member 660 and couple with the solar panel frame 504.

Additionally, the vertical support members 642 can be configured to couple with the vertical support members 582 of the track assemblies 508. In this arrangement, the top bracket assemblies can be quickly and easily attached to or coupled with the vertical support members 582 of the track assemblies 508 simply by inserting or advancing the vertical support members 642 of the top bracket assembly 520 into the inside of the vertical support members 582, thereby engaging the front bracket members 522 with the track assemblies 508 at any desired position along a length of the track assemblies 508.

The top bracket assemblies 520 can also comprise first and second hinge members 648 coupled with end portions of the vertical support members 642, the hinge members 648 being configured to rotate about the shaft members 644. This configuration permits the first adjustable support member 652, the second adjustable support member 654, and the engagement member 662 rotate about a horizontal shaft through the center of the hinges 648. Adjusting the length of the first and second adjustable support members 652, 654, and permitting the top bracket assembly 520 two rotate about the hinges, permits the angular adjustability of the solar panel frames 504 about a horizontal axis. Additionally, any embodiments of the transportable power systems disclosed herein, including transportable power system 500, can be configured such that the rotational orientation (i.e., orientation or rotation of the frames about a vertical axis) of some or all of the frames and/or solar panels can be changeable or adjustable also. The rotational orientation of the frames can be changed all together, using cables, straps, wires, control systems, or otherwise, or can be individually adjustable.

As mentioned, in the illustrated embodiment, the top bracket assemblies 520 can comprise adjustable support members 652, 654 that can be extended to a plurality of different lengths. The openings or holes formed in the first support member 640 and the first and second adjustable support members 652, 654 can have openings or holes that can receive pins, bolts, screws, or other fasteners or components to secure the adjustable members in the desired lengthwise positions.

Additionally, in any embodiments disclosed herein, an additional storage structure or transportable structure can be included with the power system to house additional electronics, batteries, inverters and/or other electrical power conversion equipment, load switching controls, communication systems, and other instrumentation and components. For example and without limitation, an additional structure having length and width of 8 feet. The additional storage structure can also have an air conditioning unit, insulation, and/or fans to maintain the controlled temperature inside storage structure.

Any embodiments disclosed herein can be configured to provide any, any combination of, or all of the following power management features: tracking the "technical and financial performance" of one or more photovoltaic systems, enabling logical and physical photovoltaic site visualization with real-time performance data for "each" individual solar panel and for the whole system, logging and presenting historical and aggregated data, comparative analysis diagnostics and a guided root-cause fault analysis, generation of comprehensive reports on site's energy production, revenues and technical status, providing immediate fault detection and troubleshooting for efficient maintenance management, monitoring and detecting problems, issues status reports and sending "alerts" via e-mail, providing wireless and satellite up-link remote service capabilities, providing playback features to visualize the harvested power of a site during a selected time fragment, providing high resolution data and visualization of past 12 months at 10 minute resolution, and/or monitoring and data collection of the system's performance down to each solar panel to ensure maximum operating efficiency. All these features can enable maintenance staff to improve the site performance, assure the yield of the system, maximize solar power harvesting and reduce maintenance costs by increasing system up-time and resolving faults more effectively.

can be included in any of the solar power system embodiments disclosed herein. Any of the embodiments disclosed herein of the assemblies, components, or parts can have any combination of the features, components, or other details of any of the other assemblies, components, or parts disclosed herein or known in the field of power generation. Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. For stated values, the term approximately can be +/−10% of the stated value. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A rapidly deploying transportable power system for generating power, comprising:
   a transport enclosure having an interior space;
   a plurality of solar panel frames, each frame supporting a plurality of solar panels;
   a plurality of interconnectable track modules, the track modules being couplable together in an end to end arrangement to form a track system;
   one or more cart devices movable along a length of the track system to move the frames along the track system when the track system is in a second state; and
   at least one lift system configured to lift the frames from the interior space of the transport enclosure onto the track system and/or from the track system into the interior space of the transport enclosure;
   wherein:
   each solar panel supported by each frame is electrically interconnected with the other solar panels of each frame;
   the solar panel frames and track modules can be moved between a first state and Rafisaid second state; in the first state, the frames are all positioned at least substantially within the interior space of the transport enclosure;
   in the first state, all of the track modules are positioned within the interior space of the transport enclosure;
   in the second state, the track modules are positioned on the ground in a series with the end of one track module coupled with an end of an adjacent track module to form the track system such that the one or more cart devices are movable continuously along the track system between a first end and a second end of the track system, the first end of the track system being adjacent to the transport enclosure when the frames are being deployed onto the track system; and in the second state, the frames are supported by the track system outside of the transport enclosure, the frames being positioned along the length of the track system at a predetermined spacing to permit suitable exposure to the sun for each frame.

2. The transportable power system of claim 1, wherein each frame is supported by at least one bottom bracket and at least one top bracket in the second state, the bottom bracket supporting a lowermost edge of the frame when the frame is deployed in the second state, and the top bracket having an adjustable length and angular orientation to permit the angular adjustability of the frame about a horizontal axis.

3. The transportable power system of claim 1, comprising
   a first said track system,
   a second said track system, and
   two or more said cart devices,
   wherein:
   the first track system extends in a direction that is generally parallel with the second track system; the first track system is substantially aligned with the second track system in a lengthwise direction; and
   at least one cart is moveable along each of the first and second track systems for moving each frame along the first and second track systems when the track systems are in the second state.

4. The transportable power system of claim 1, comprising a first said lift system coupled with the transport enclosure adjacent to a first end of the transport enclosure and a second said lift system coupled with the transport enclosure adjacent to a second end of the transport enclosure, the first and second lift systems operable simultaneously to lift the frames from the interior space of the transport enclosure onto the track system and/or from the track system into the interior space of the transport enclosure.

5. The transportable power system of claim 1, wherein each frame is supported by at least one bottom bracket and at least one top bracket in the second state, and each bottom bracket and top bracket are supportable by the track system within openings formed in the track modules configured to receive vertical support portions of the top and bottom brackets.

6. The transportable power system of claim 1, wherein an angular orientation of each of the frames about a horizontal axis is adjustable.

7. The transportable power system of claim 1, wherein a rotational orientation of the frames can be changed between at least a first and a second rotational orientation about a vertical axis by rotating the frames.

8. The transportable power system of claim 1, wherein each of the frames is pre-wired and has an electrical connector extendable therefrom that can be connected with an electrical connector of an adjacent one of the frames or of another electrical component.

9. The transportable power system of claim 1, wherein the transport enclosure is approximately 20 feet long, approximately 8 feet wide, and approximately 57 inches tall, and the power system can produce approximately 24 kW of solar power.

10. The transportable power system of claim 1, further comprising one or more batteries adapted to store energy generated by the solar panels.

11. The transportable power system of claim 1, wherein the at least one lift system comprises a cable, a wench, and a boom.

12. The transportable power system of claim 1, comprising a removable cover for covering at least a top surface above the interior space.

13. The transportable power system of claim 1, comprising a power inverter adapted to change the power generated by the solar panels from direct current to alternating current and a control device configured to control one or more aspects of operation of the transportable power system.

14. The transportable power system of claim 1, wherein:
   the cart devices each have a first lower wheel and a first upper wheel on a first side of the cart devices and a second lower wheel and a second upper wheel on a second side of the cart;
   the first lower wheel is oriented to roll along a lower half of a first rail member of the track modules;
   the second lower wheel is oriented to roll along a lower half of a second rail member of the track modules;
   the first upper wheel is oriented to roll along an upper half of the first rail member; and
   the second upper wheel is oriented to roll along an upper half of the second rail member.

15. A method of providing transportable solar power, comprising:
- providing a transportable enclosure having an interior space;
- providing a plurality of solar panel frames, each frame supporting a plurality of solar panels;
- providing a plurality of interconnectable track assemblies comprising a first rail member and second rail member, the track assemblies being couplable together in an end to end arrangement to form a track system;
- providing a cart device movable along a length of the track system to move the frames along the track system when the track system is in a second state; and
- providing a first top bracket assembly and a second top bracket assembly, wherein the first top bracket assembly is coupled to the first rail member by a first support member and the second top bracket assembly is coupled to the second rail member by a second support member; wherein each of said first top bracket assembly and said second top bracket comprise:
  - a hinge member;
  - an adjustable support member assembly comprising:
    - a first adjustable support member;
    - a second adjustable support member;
  - wherein the first adjustable support member of the first top bracket assembly is configured to rotate up from the first rail member about said hinge member and the first adjustable support member of the second top bracket assembly is configured to rotate up from the second rail member about said hinge member; and wherein the first adjustable support member is telescopically adjustable with the second adjustable support member to adjust a length of the adjustable support member assembly and change an angular orientation of one of the solar panel frames of the plurality of solar panel frames;
- wherein:
- each solar panel supported by each frame is electrically interconnected with the other solar panels of each frame;
- the solar panel frames and the track assemblies are configured to be moved between a first state and a second state; in the first state, the plurality of frames are positioned in the interior space of the transport enclosure;
- positioning the transportable enclosure on a ground surface;
- positioning the plurality of track assemblies from the interior space of the transportable enclosure onto the ground surface;
- arranging the plurality of track assemblies into an end to end arrangement with one another to form said track system extending away from the transportable enclosure in a linear arrangement;
- positioning the cart device on the track system adjacent to the first end of the track system;
- moving a first solar panel frame from the interior space of the transportable enclosure onto the cart device;
- moving the first solar panel frame along the track system from the first end of the track system to a first deployment position;
- coupling the first solar panel frame to the track system at the first deployment position;
- supporting a first end portion of the first solar panel frame with said first top bracket assembly and a second end portion of the first solar panel frame with the second top bracket assembly, with the second end portion being opposite the first end portion; and
- adjusting an angular orientation of the first solar panel frame by adjusting said length of the adjustable support member assembly of the first top bracket assembly with respect to the adjustable support member assembly of the second top bracket assembly to change an angular orientation of the solar panel about a horizontal axis for solar exposure.

16. The method of claim 15, wherein each of the first top bracket assembly and the second top bracket assembly comprise a vertical support member and wherein the track assembly comprises a vertical support member, wherein the method further comprises coupling the vertical support member of the first top bracket assembly and the second top bracket assembly with the vertical support member of the track assembly.

17. The method of claim 15,
wherein the plurality of solar panel frames includes at least ten solar panel frames; wherein the method further comprises:
- moving each of the at least ten solar panel frames from the interior space of the transportable enclosure onto each of ten different deployment positions along two or more of said track systems;
- coupling each of the ten solar panel frames to the two or more track systems at the ten deployment positions; and
- tilting each of the ten of solar panel frame to a desired angular orientation for solar exposure.

18. The method of claim 15, comprising storing at least a portion of the power produced using one or more batteries stored in the transportable enclosure.

* * * * *